Figure 10:
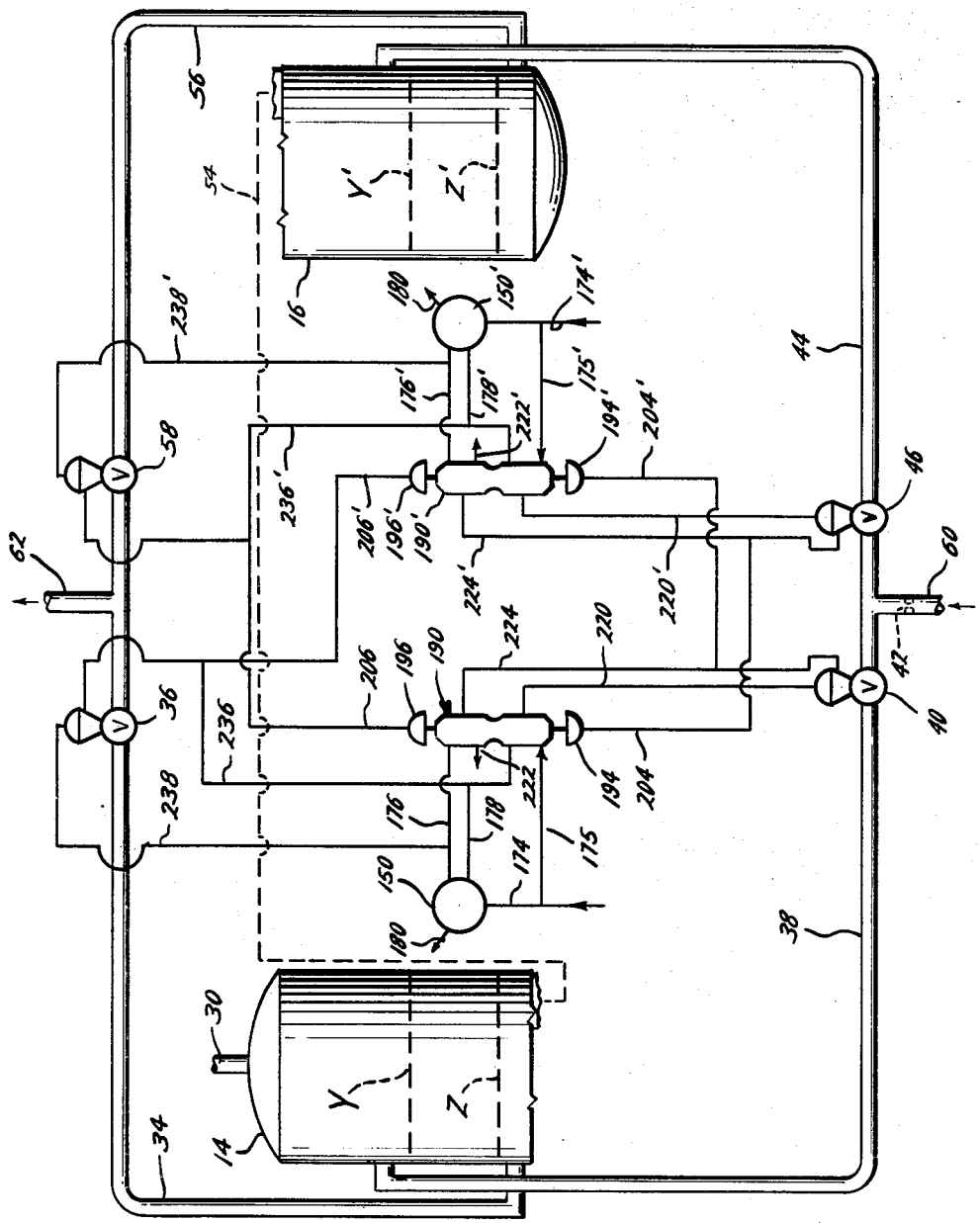

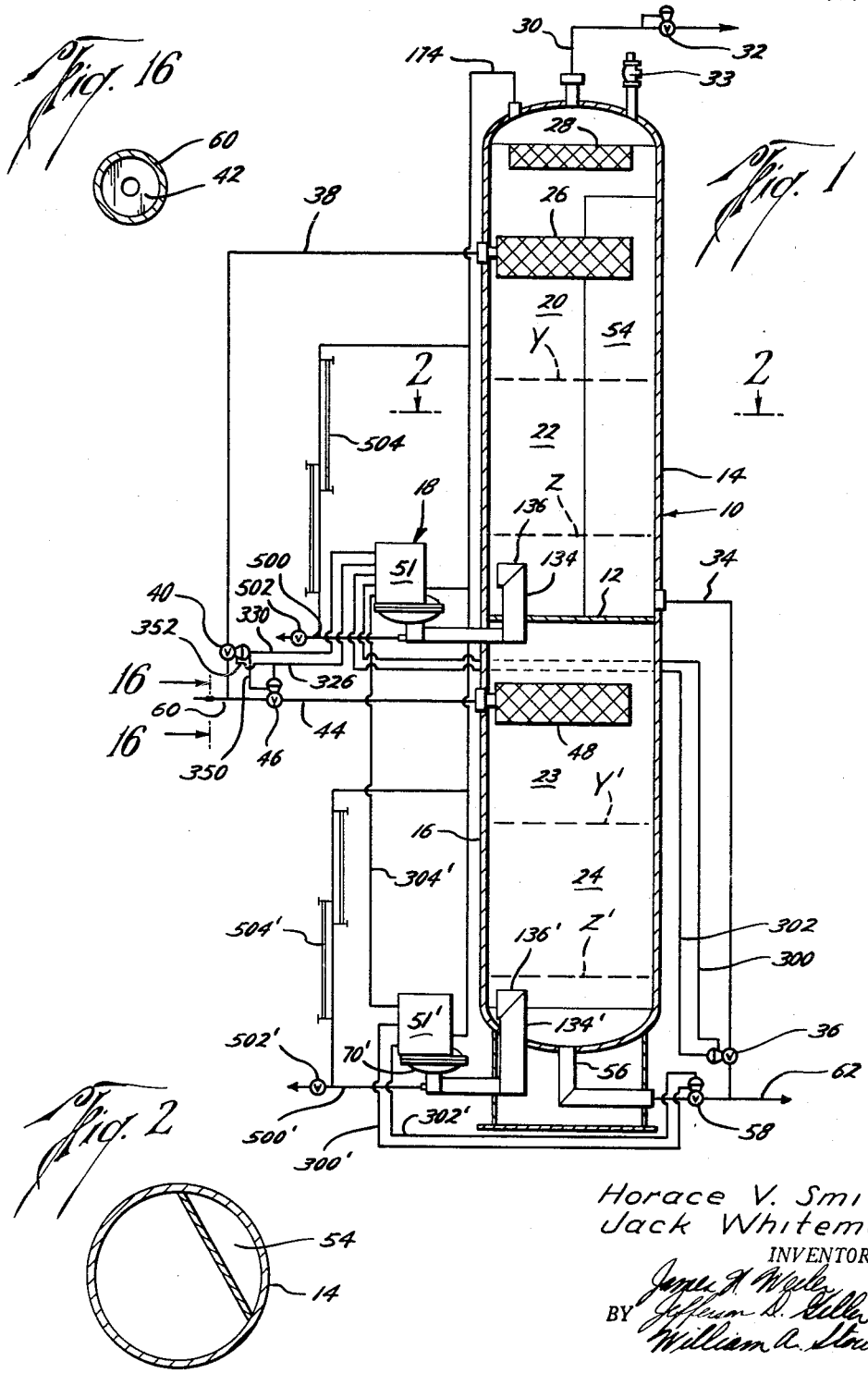

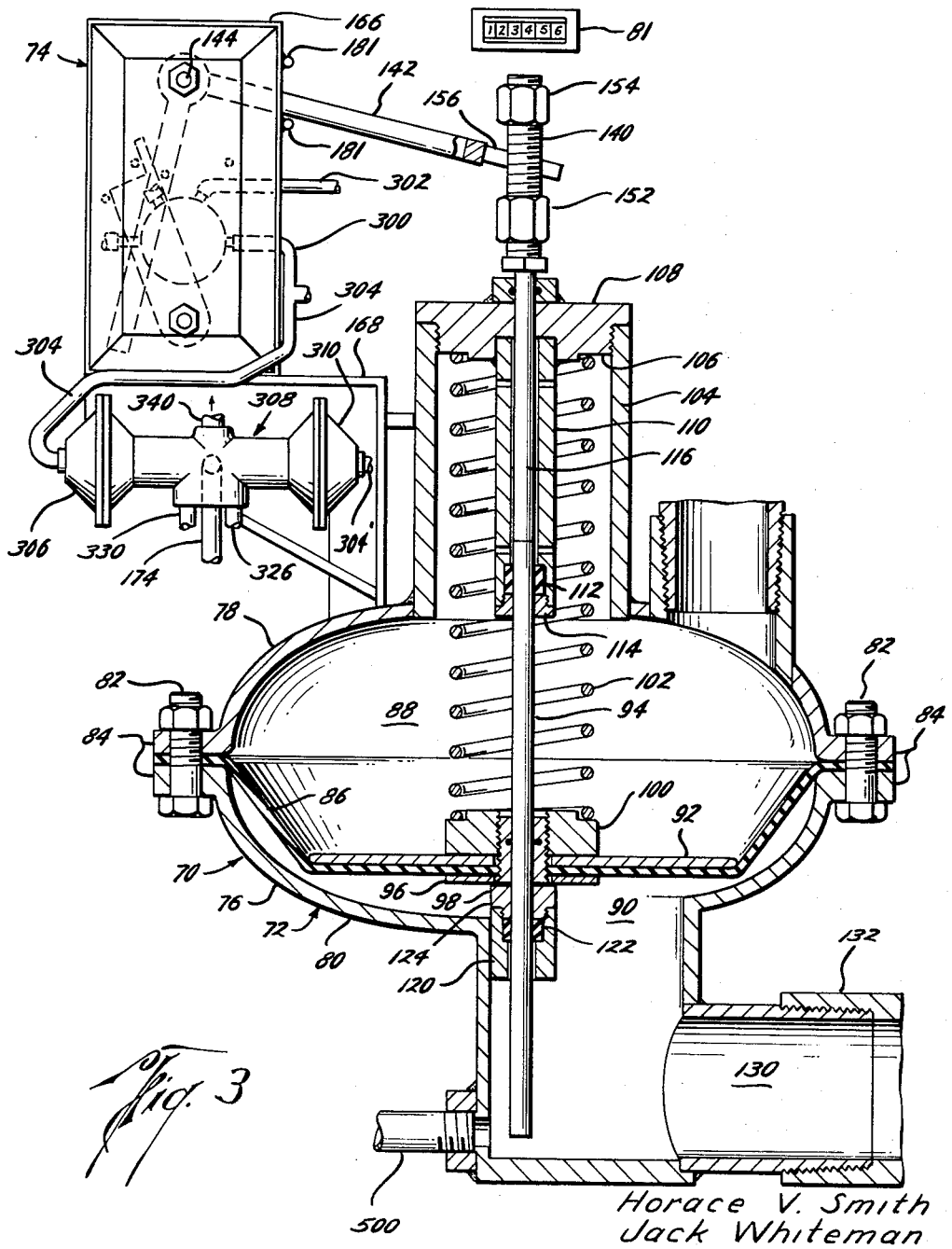

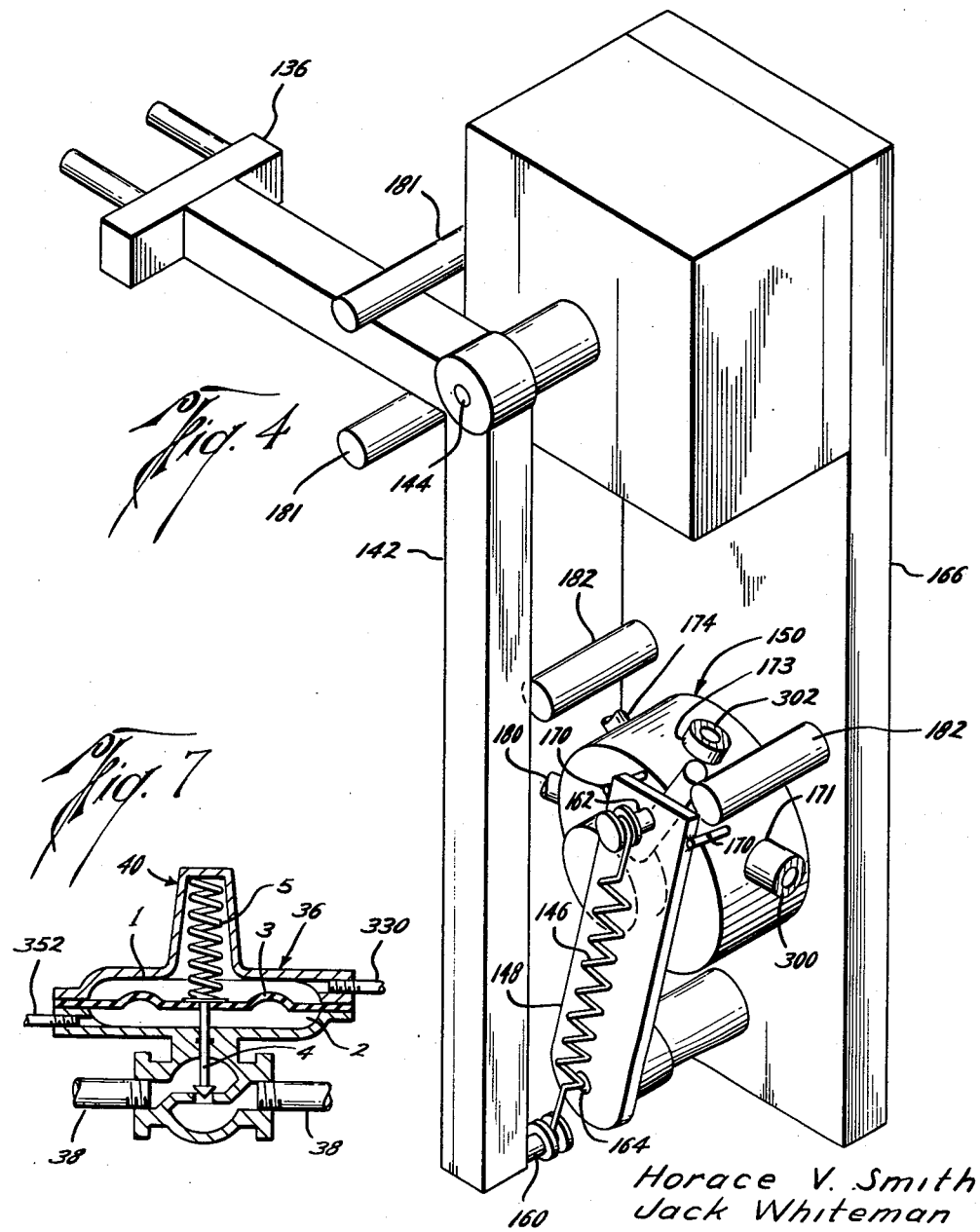

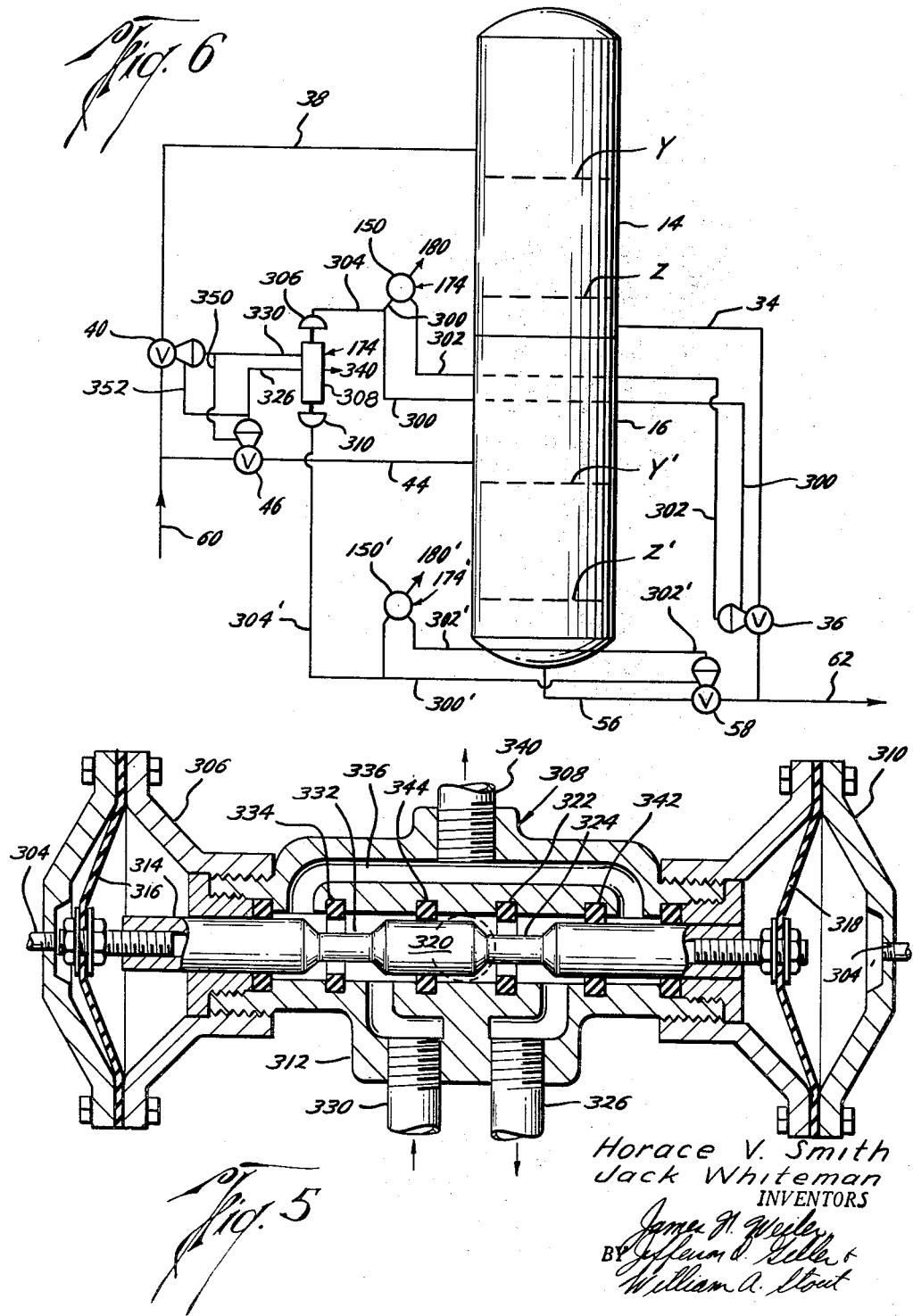

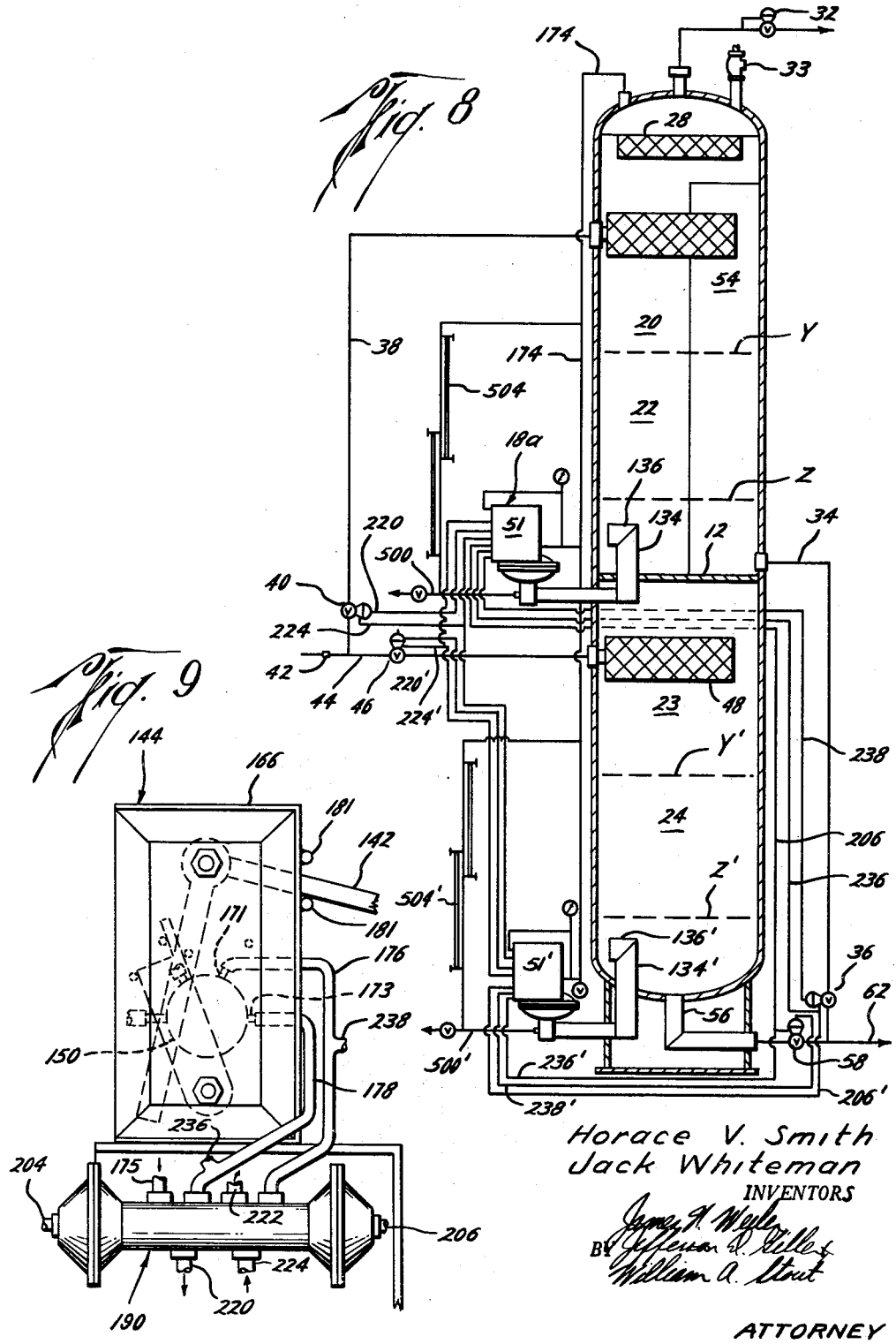

Aug. 25, 1964  H. V. SMITH ETAL  3,145,565
CONTINUOUS FLOW SEPARATING AND METERING ASSEMBLY
Filed Feb. 18, 1960  9 Sheets-Sheet 6

Horace V. Smith
Jack Whiteman
INVENTORS

BY

ATTORNEY

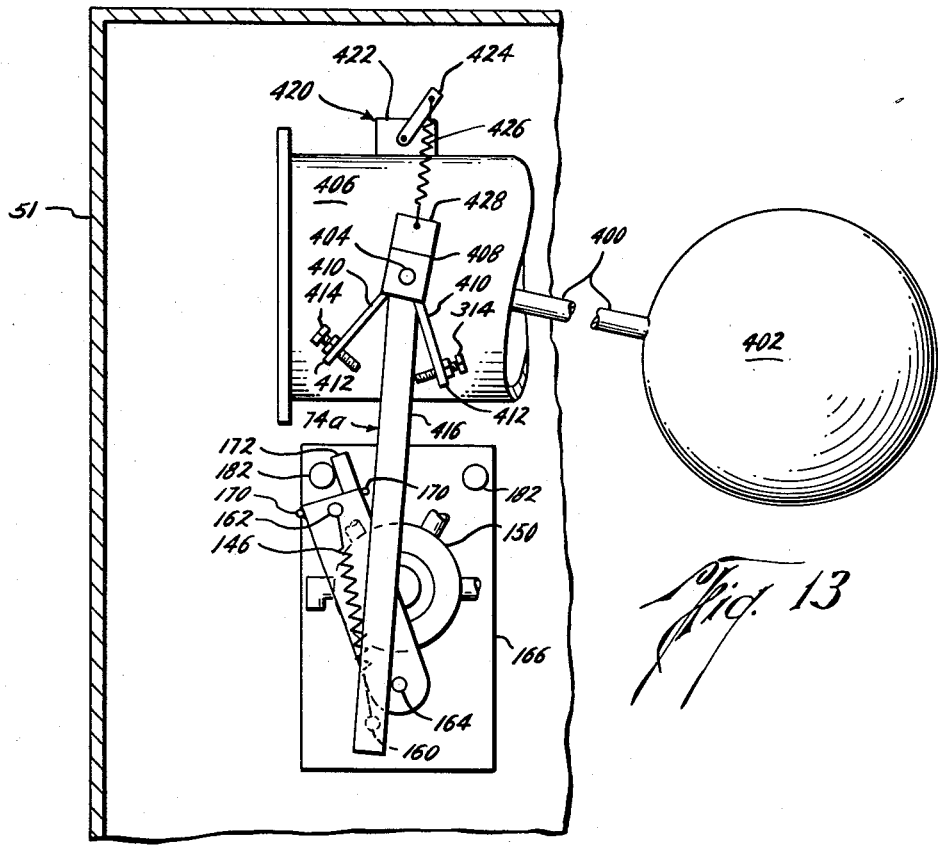
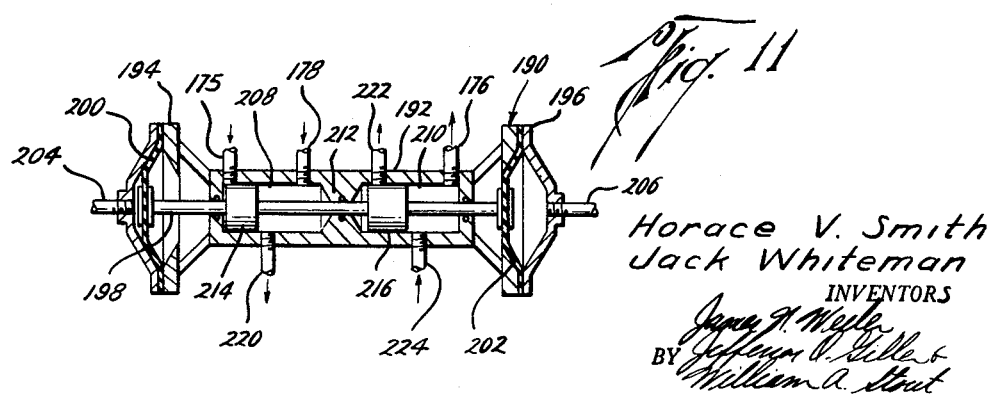

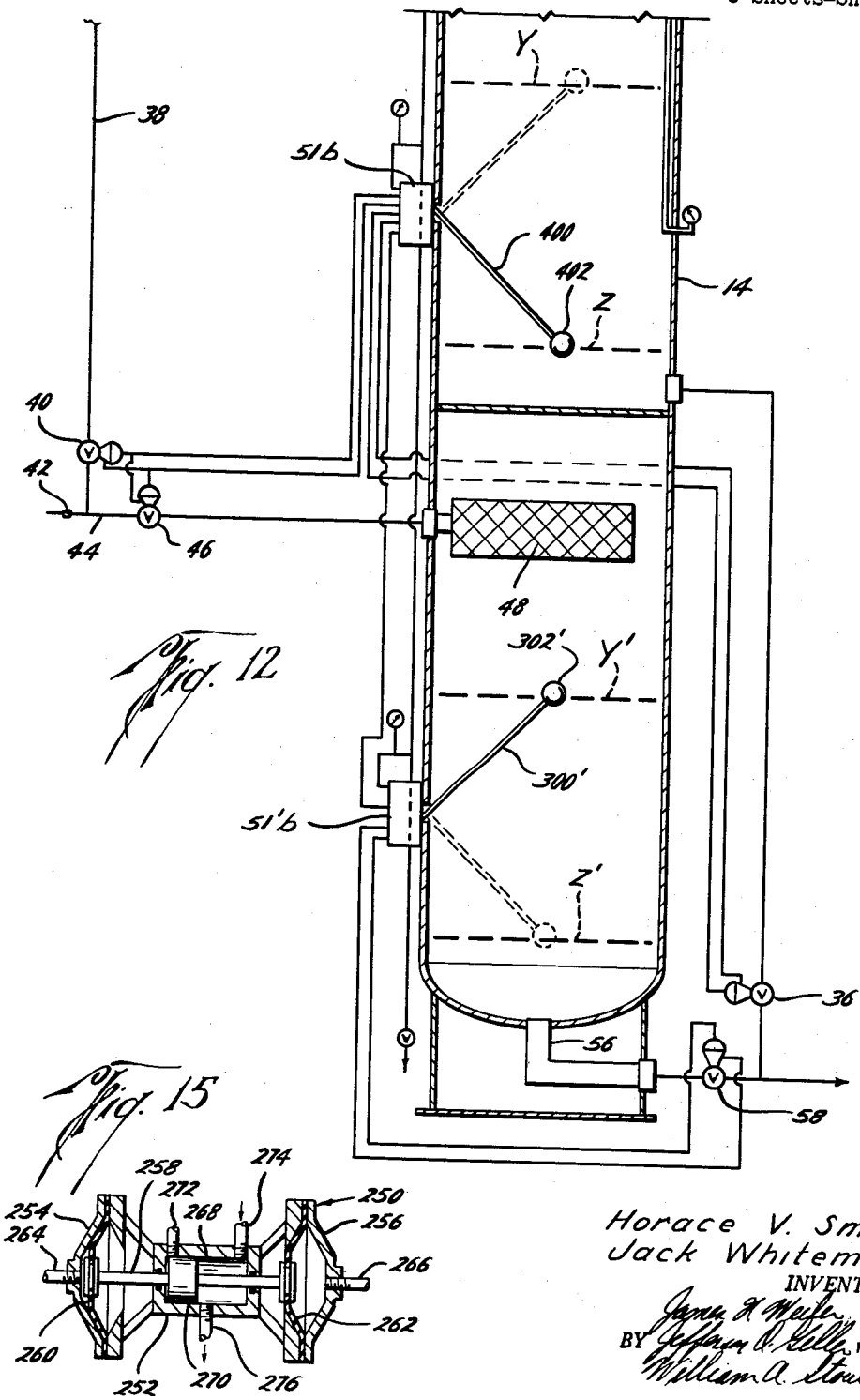

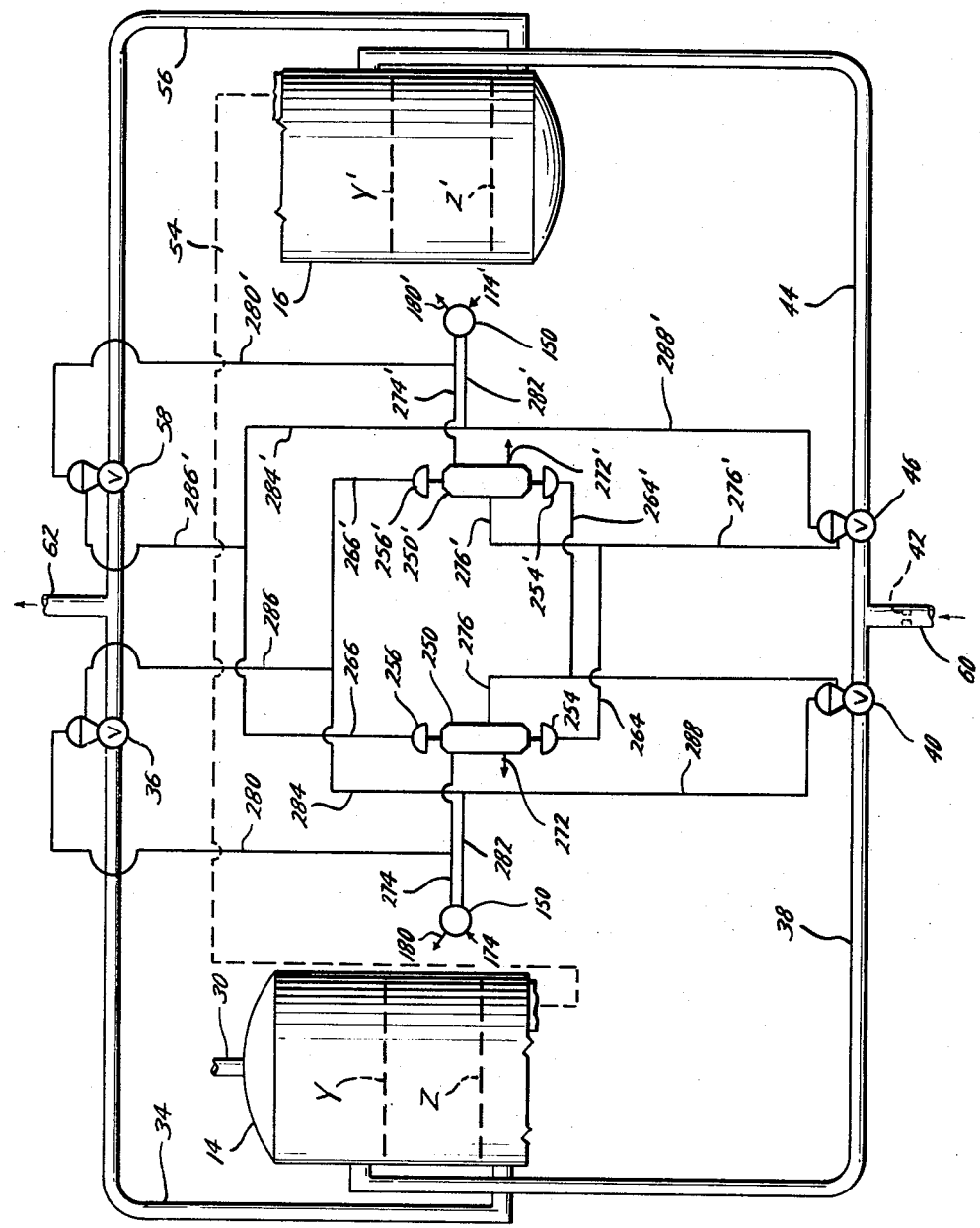

United States Patent Office 3,145,565
Patented Aug. 25, 1964

3,145,565
CONTINUOUS FLOW SEPARATING AND
METERING ASSEMBLY
Horace V. Smith and Jack Whiteman, Houston, Tex.,
assignors to Metrol Corporation, a corporation of
Texas
Filed Feb. 18, 1960, Ser. No. 9,504
9 Claims. (Cl. 73—200)

This application relates to a continuous flow separating and metering assembly having alternate filling and draining containers and includes a novel control system for directing a flow of fluid alternately into and from a pair of containers.

In the treatment of certain fluids, especially oil well fluids, it is common practice to direct a continuous flow of liquids and gases into the separating chamber of a vessel having both a lower metering chamber and an upper separating chamber. In the separating chamber the liquids and gases are separated by gravity with the gases passing out the top of the chamber and the liquids collecting in the bottom of the upper chamber. Intermittently this liquid is allowed to flow by gravity through a conduit from the separating chamber down to the meter chamber which it fills to a predetermined upper level. When the liquid in the metering chamber reaches the predetermined upper level a valve closes the conduit from the separator chamber and an outlet valve is opened to drain the liquid from the metering chamber until the liquid reaches a predetermined low level whereupon the outlet valve is closed. By counting the number of times the meter chamber fills and empties the volume of liquid is metered.

Because the liquid intermittently flows from the separating chamber to the metering chamber through a conduit and because this flow is normally gravity flow in that the pressure in the upper and lower chambers is normally the same, such separating metering assemblies are not satisfactory where the liquid being moved is viscous, such as certain oils.

It is therefore a general purpose of the present invention to provide a continuous flow separating and metering assembly in which the separating chambers and metering chambers are not separated.

An attempt has been made to overcome this problem of separating and metering well fluids containing gas and viscous oils by providing a vessel having a vertical partition separating it into two vertical halves with the fluid being directed first to one half and then to the other half in a manner that will be described in more detail later herein. However, such a device has been found unsatisfactory because of the low rate of separation especially where the liquid involved is foaming.

It is therefore another general object of the present invention to provide a continuous flow separating and metering assembly having alternate filling and draining containers having greatly increased rates of separation.

A more particular object of the present invention is to provide a continuous flow separating and metering assembly including a vessel, a substantially horizontal partition extending across the interior of the vessel dividing it into upper and lower containers with each container being both a separator and a meter, and a control assembly for directing a flow of fluid alternately and simultaneously into and from the containers.

A further object of the present invention is a novel control system for directing a flow of fluid alternately and simultaneously into and from first and second containers through an inlet and an outlet flow line connected to each of said containers.

Other and further objects, features and advantages will be apparent from the following description of the presently preferred examples of the present invention, given for the purpose of disclosure and taken in conjunction with the accompanying drawings where like character references designate like parts throughout the several views and where:

FIGURE 1 is a sectional elevation, partly diagrammatic, of a continuous flow separating and metering assembly constructed in accordance with the present invention, FIGURE 2 is a view along the line 2—2 of FIGURE 1, FIGURE 3 is an elevation, partly in section, illustrating a portion of the control assembly used in the form of the invention illustrated in FIGURE 1, FIGURE 4 is a perspective view of a portion of the structure of FIGURE 3, FIGURE 5 is a sectional elevation of the secondary pilot valve illustrated in FIGURE 3, FIGURE 6 is a diagrammatic view of the preferred form of control assembly used in the form of separating and metering assembly illustrated in FIGURE 1, FIGURE 7 is a partly diagrammatic sectional elevation of the preferred form of flow valve used in the present invention, FIGURE 8 is a view similar to FIGURE 1 but illustrating the use of a modified control assembly, FIGURE 9 is an elevation illustrating a portion of a modified control assembly used in FIGURE 8, FIGURE 10 is a diagrammatic view of a modified form of control assembly used in the form of separating and metering assembly illustrated in FIGURE 8, FIGURE 11 is a partly diagrammatic sectional elevation of a secondary pilot valve used in the control assembly of FIGURE 10, FIGURE 12 is a view similar to FIGURE 1 but illustrating a further modification thereof, FIGURE 13 is an elevation of a portion of a control assembly used in the form of separating and metering assembly of FIGURE 12, FIGURE 14 is a diagrammatic view of a modified form of control assembly used in the form of separating and metering assembly illustrated in FIGURE 12, FIGURE 15 is a partly diagrammatic sectional elevation of a secondary pilot valve used in the modified control assembly of FIGURE 14, and FIGURE 16 is an enlarged view along the line 16—16 of FIGURE 1.

Referring now to the drawings, and particularly to FIGURE 1, the continuous flow separating and metering assembly includes as a whole, a vertical vessel indicated generally by the numeral 10 divided by a partition 12 to form an upper container 14 and a lower container 16 into which containers liquids and gases are alternately directed to, and from which liquids are alternately drained, by means of a flow control means, assembly or system indicated generally by the numeral 18.

The vessel 10 is divided into the upper and lower liquid tight containers 14 and 16 respectively by the substantially horizontal partition 12 secured to and extending across the interior of the vessel 10 at approximately its vertical midpoint. The upper section 20 of the upper container 14 is a separating chamber and the lower section 22 is a metering chamber. Communicating with the upper portion of the upper container 14, that is in the separating chamber 20, is an inlet flow line 38 for introducing fluid into the container 14 at a conventional inlet deflector 26 so that gas in the fluid flows upwardly through a conventional screen or mist extracting element 28 located at the upper part of the upper container 14 and the liquid falls to the lower section 22 of the upper container 14. A gas outlet line 30 passing through a conventional back pressure valve 32 is provided in the upper section of the upper container 14 to allow gas to escape therefrom. A discharge or liquid outlet line 34 is provided at a lower portion of the upper container 14 through which line 34 liquid is drained in response to the actuation of the outlet flow valve 36. The fluid enters the upper container 14 through the inlet flow line 38 controlled by actuation of the inlet flow valve 40. The lower container 16 similarly has an upper section 23 which acts as a separator chamber and a lower section 24 which acts as a metering chamber. Liquids and gases are introduced into this separator chamber by passing through the inlet flow line 44 in response to actuation of the inlet flow valve 46. An inlet deflector 48 adjacent the point of entrance of the inlet flow line 44 is provided. Liquid in the fluid entering the lower container 16 falls to the lower section or metering chamber 24 while the gases pass upwardly to the gas outlet line 30 through a gas passage 54 extending through the partition 12 and the metering chamber 22 of the upper container 14 to the vicinity of the mist extracting element 28 in the upper container 14.

A relief or safety valve 33 is provided in the top of the vessel 10. At a lower portion of the lower container 16 is connected an outlet flow line 56 through which liquid is drained in response to the operation of the outlet valve 58.

The inlet flow lines 38 and 44 are connected to the common supply line 60 and the outlet flow lines 34 and 56 are connected to the common drain line 62. Flow control means are provided to assure that the emptying containing, either 14 or 16, empties before the filling container fills such as by providing a restrictive orifice 42 (FIGURES 1 and 16) in the common supply line 60 so that the liquid discharge rate from the containers 14 and 16 will exceed the liquid inflow rate to these containers. Another means of controlling the emptying and filling time of these containers 14 and 16 is by controlling the pressure in the vessel 10 by means of the back pressure valve 32 so that the pressure differential between the common supply line 60 and the interior of the vessel 10 sufficiently differs from the pressure differential between the interior of the vessel 10 and the common drain line 62 that the liquid drains quicker than it fills.

The control assembly 18 includes and actuates the flow valves 36, 40, 46 and 58 in the desired sequence in response to changes in liquid levels in the upper and lower containers 14 and 16 respectively. Illustrated in FIGURES 1, 3, and 4 is a portion of the control assembly 18 including movable means associated with each liquid container movable in response to changing liquid levels therein to actuate an interlocking valve element actuating assembly connected to the flow valves 36, 40, 46, and 58.

In the form of the invention illustrated in FIGURES 1, 3 and 4 the movable means associated with the liquid containers movable in response to changing liquid levels therein are hydrostatic head controllers. Identical such hydrostatic head controllers are associated with each of the upper and lower containers 14 and 16.

Referring now to FIGURE 3 there is illustrated the hydrostatic head controller 70 associated with the upper container 14, which hydrostatic head controller 70 includes the diaphragm assembly 72 and the snap acting mechanism 74. The diaphragm assembly 72 includes a diaphragm housing 76 having an upper cap 78 and a lower cap 80 held together by the bolts 82 in the flanges 84. An imperforate flexible diaphragm 86 held at its periphery by the flanges 84 forms a movable member which divides the diaphragm housing 76 into upper and lower chambers 88 and 90 respectively. Provided on the top of the diaphragm 86 is a metal diaphragm plate 92 vertically through the center of which passes a guide stem 94 secured to and movable with the diaphragm plate 92 and the diaphragm 86 by a cramp ring 96 and cramp stud 98 on the lower side of diaphragm 86 and by a cramp nut 100 on the upper surface of the diaphragm plate 92. Thus upon reciprocation of the diaphragm 86, as will be explained later, the stem 94 vertically reciprocates therewith.

Tending to depress the diaphragm 86 into the position illustrated in FIGURE 3 is the compression spring 102 resting at its lower end on the cramp nut 100 and passing upwardly into the spring case 104 extending upwardly from the diaphragm housing 76. The spring 102 internally receives the stem 94 and bears against an annular shoulder 106 of a closure cap 108 threadably secured in the upper end of the spring case 104. Depending from the closure cap 108 is a tubular upper stem guide 110 into the lower end of which slideably extends the stem 94.

The lower end of the upper stem guide 110 is provided with a guide bushing 112 held in place by a nut 114 to receive the wear between the stem 94 and the upper stem guide 110 as the stem 94 reciprocates. Secured to and extending upwardly from the upper end of the stem 94 through the upper stem guide 110, and slideable through the closure cap 108 is a stem extension 116 so that reciprocating motion of the diaphragm 86 is transmitted through the stem 94 and the stem extension 116 to the exterior of the diaphragm housing 76.

Below the diaphragm 86 the stem 94 is slideably received by a lower stem guide 120 secured such as by welding to the diaphragm housing 76 with this lower stem guide 120 having at its upper end a lower guide bushing 122 held in place by a lower guide nut 124. As illustrated, the lower guide nut 124 is contacted by the cramp stud 98 when the diaphragm 86 is in its lowest position as illustrated in FIGURE 3 and prevents further downward movement of the diaphragm 86.

The lower portion of the diaphragm housing 76 below the diaphragm 86 is provided with a fluid inlet 130 receiving the diaphragm flow line 132 connected to the vertical stand pipe 134 (see FIGURE 1) extending into the lower part of the container 14 so that the weight of liquid in the container 14 may be exerted against the lower surface of the diaphragm 86 and tend to move it upwardly overcoming the spring 102. The standpipe 134 is provided with an elbow 136 at its top so that debris in liquid in the container 14 will not settle into the standpipe 134. The lowest level Z reached by the liquid in the container 14 is always above the elbow 136.

A drain line 500 connected to the lower chamber 90 of the diaphragm assembly 72 through a 2-way valve 502 provides drainage for the lower chamber 90 (FIGURES 1 and 3). A manometer 504 is provided between this drain line 500 and the separating chamber of the upper container 14 for use in calibrating the hydrostatic liquid level controller 70.

Referring to FIGURES 3 and 4, the snap acting mechanism 74 is shown to include the adjustable engaging member 140 secured to the top of the stem extension 116 for movement therewith, an L-shaped swing arm 142 pivotally mounted on a shaft 144, and a tension spring 146 secured to the spring arm 142 and to a pivot arm 148 for actuation of a primary pilot valve 150.

The adjustable engaging member 140 is an externally threaded sleeve secured at its lower end to the upper end of the stem extension 116. A lower stop nut 152 and an upper stop nut 154 on the adjustable engaging member 140 provide adjustment for upper and lower liquid levels Y and Z in the container 14 as will be hereafter explained. Bracketing the adjustable engaging member 140 between the upper and lower stop nuts 154 and 152 respectively is a substantially U-shaped bracket 156 secured to one end of the swing arm 142 which bracket is contacted by these stop nuts 152 and 154 after predetermined reciprocation of the adjustable engaging member 140 thereby providing lost motion between the stem 94 and the swing arm 142.

One end of the tension spring 146 is secured to a pin 160 extending from the lower end of the swing arm 142 and the other end is secured to a pin 162 extending from the pivot arm 148. The pivot arm 148 is pivotally mounted by the shaft 164 in the plate 166 and secured to a bracket 168 mounted on the diaphragm housing 76. Secured to and projecting from the upper end of the pivot arm 148 is a pair of spaced projections 170 forming contact members that strike the pilot valve actuating arm 172 of the primary pilot valve 150 when the pivot arm 148 is moved from side to side thereby moving the pilot valve actuating arm 172 and actuating the primary pilot valve 150. In the primary pilot valve 150 here illustrated a gas supply line 174 from the top of the upper container 14 (FIGURE 1) supplies pressure to the primary pilot valve 150 with pressure being selectively directed therefrom into the primary pressure lines 300 and 302 from the ports 171 and 173 respectively by movement of the pilot valve actuating arm 172. In operation, a conventional exhaust port 180 permits back pressure to drain from the line 300 or 302 not then being supplied with fluid pressure. Such a primary pilot valve is readily available commercially and no detailed description of it is necessary.

As shown, the tension spring 146 is connected to the swing arm 142 on one side of the shaft 164 forming the pivot of the pivot arm 148 and connected to the pivot arm 148 on the other side of the shaft or pivot point 164. Thus, the tension of the spring 146 tends to hold the pivot arm 148 on whatever side of the shaft 164 the lower end of the spring 146 is at that time.

To prevent the pivot arm 148 from damaging the primary pilot valve 150 when the pilot valve actuating arm 172 is thrown from side to side by the projections 170, a pair of stops 182 extend outwardly from the plate 166 on each side of the pilot actuating arm 172. These stops 182 are spaced so that the pilot valve actuating arm 172 has sufficient movement to operate the primary pilot valve 150 but are placed close enough together to prevent damage to the primary pilot valve. Stop pins 181 extending from the plate 166 on both sides of the swing arm 142 also prevent excessive movement of the swing arm 142.

In operation of the snap acting mechanism 74, the reciprocation of the diaphragm 86 and consequently of the stem extension 116 causes corresponding movement in the adjustable engaging member 140. This causes the stop nuts 152 and 154, after predetermined movement, to alternately contact the swing arm 142 and swing it first in one direction and then in the other in response to movement of the adjustable engaging member 140 as described. As the lower end of the swing arm 142 passes from one side to the other, tension on the spring 146, when it passes a straight line through the shaft 164 and the pin 162, snaps the pivot arm 148 from one extreme position to the other. As the pivot arm 148 is oscillated on its shaft 164 the projections 170 strike the pilot valve actuating arm 172 actuating the primary pilot valve 150.

Varying the distance between the inner ends of the stop nuts 152 and 154 and the swing arm 142 varies the amount of movement of the diaphram 86 needed to actuate the snap acting mechanism 74. As the extent of movement of the diaphragm 86 is dependent upon the hydrostatic head acting against its lower surface this adjustment of the stop nuts 152 and 154 calibrates the amount of hydrostatic head and hence predetermines the liquid levels Y and Z controlled by the hydrostatic head controller 70.

This lost motion snap acting mechanism 74 other than the primary pilot valve 150 and the adjustable engaging member 140 is disclosed and claimed in United States Patent No. 2,818,738, issued January 7, 1958, for a Snap Acting Mechanism, and no further description of it is necessary.

Provided above the adjustable engaging member 140 is a conventional counter 81 which is contacted by and actuated by the adjustable engaging member 140 each time it rises thus recording each time the liquid in the upper container 14 reaches the upper level Y.

The first and second primary pressure lines 300 and 302 from the ports 171 and 173 respectively of the primary pilot valve 150 are connected to the outlet valve 36, as later explained, and the branch line 304 from the primary pressure line 300 is connected to the left hand diaphragm assembly (FIGURES 3 and 5) of a secondary pilot valve 308 which is a double diaphragm 4-way valve and which, like the primary pilot valve 150, directs gas from an inlet to one of two pressure lines while it simultaneously drains pressure from the other pressure line through a vent.

The secondary pilot valve 308 includes the left hand diaphragm assembly 306 and the right hand diaphragm assembly 310. Contained in the housing 312 of this pressure responsive secondary pilot valve 308 is the horizontal valve stem 314 connected at its left end to a flexible diaphragm 316 in the left hand diaphragm assembly 306 and connected at its right end to a flexible diaphragm 318 in the right hand diaphragm assembly 310. In the position shown in FIGURE 5 pressure has been applied to the outside of the right hand diaphragm 318 and bled from the outside of the left hand diaphragm 316 forcing the valve stem 314 to the left. By bleeding pressure from the right hand diaphragm assembly 310 and applying it to the left hand diaphragm assembly 306 the valve stem 314 would be reciprocated to the right. If there is no pressure differential between the diaphragm assemblies 306 and 310 the valve stem will remain in whatever position it is at that time.

In the position illustrated in FIGURE 5 gas pressure entering the inlet port 320 connected to the gas supply line 174 passes to the right between the bushing 322 and the right hand reduced portion 324 of the valve stem 314 into the secondary pressure line 326. Pressure in the secondary presure line 330 drains between the left hand reduced portion 332 of the valve stem 314 and the bushing 334, through the exhaust passage 336 and out the exhaust port 340. In this position illustrated in FIGURE 5 pressure from the inlet 320 is prevented from entering the exhaust passage 336 because of the close fit of the bushing 342 around the valve stem 314 and is prevented from entering the pressure line 330 by the close fit between the bushing 344 and the valve stem 314. When the valve stem 314 is reciprocated to the right, fluid pressure entering the port 320 will pass between the left hand reduced portion 332 of the valve stem 314 and the bushing 344 into the line 330 with escape of this pressure through the outlet passage 336 being prevented by the bushing 334. In this same position of the valve stem 314 the bushing 322 will prevent any pressure entering at the inlet port 320 from entering into the pressure line 326 and pressure in the pressure line 326 will exhaust between the right hand reduced portion 324 of the valve stem 314 and the bushing 342 into the exhaust passage 336 out the exhaust port 340. Thus, as the valve stem 314 is reciprocated, pressure entering the inlet port 320 will be alternately directed through the pressure lines 330 and 326 while it is simultaneously drained from the other. Further, the valve stem 314 with its reduced diameter portions 332 and 324 form a control member constructed and arranged to move between first and second positions upon alternate applications of pressure to opposed ends of this control member.

The pressure responsive pilot valve 308 may be of any preferred type of which several are readily available on the commercial market and accordingly no further description thereof is necessary.

All the structure illustrated in FIGURES 4 and 5 and all of the snap acting mechanism 74 and all of the diaphragm assembly 72 above the diaphragm housing 76 in FIGURE 3 are contained in the case 51 shown in FIGURE 1.

The lower container 16 is similarly equipped with an identical hydrostatic head controller and a primary pilot valve which are given the same numbers primed (where illustrated) as the numbers given to the hydrostatic head controller 70 and primary pilot valve 150, used with the upper container 14. No additional secondary pilot valve 308 is needed for the lower container 16.

Referring now to FIGURE 7 there is illustrated the inlet flow valve or valve element 40, which is identical to the other flow valves 36, 46 and 58. This valve 40 is a double acting pressure responsive valve and includes a valve closing chamber 1 and a valve opening chamber 2 separated by a movable diaphragm 3 connected to a valve stem 4 so that the application of pressure to the valve closing chamber 1 from the line 330 and simultaneous draining of pressure from the valve opening chamber 2 through the line 352 causes the valve to close and similarly the application of pressure to the valve opening chamber 2 and the simultaneous draining of pressure from the valve closing chamber 1 causes the valve to open. A compression spring 5 continuously urges the valve stem 4 downwardly to aid in closing the valve and to hold it closed when there is no pressure differential between the valve closing and opening chambers 1 and 2 respectively. Such a valve is readily available commercially and no further description of it is deemed necessary.

In FIGURE 6 is illustrated the preferred control assembly of the present invention. The primary pressure line 302 from the primary pilot valve 150 connects to the valve closing chamber of the outlet valve 36 of the container 14 and the primary pressure line 300 connects to the valve opening chamber of the same outlet valve 36. A branch line 304 of the primary pressure line 300 is connected to the diaphragm assembly 306 of the secondary pilot valve 308. A primary pressure line 302' from the primary pilot valve 150' connects to the valve closing chamber of the outlet valve 58 of the container 16 while the primary pressure line 300' connects to the valve opening chamber of said outlet valve 58. A branch line 304' of the primary pressure line 300' is connected to the diaphragm assembly 310 of the secondary pilot valve 308.

The secondary pressure line 330 from the secondary pilot valve 308 is connected to the valve closing chamber of the inlet valve 40 to the upper container 14 while a branch line 350 from the secondary pressure line 330 is connected to the valve opening chamber of the inlet valve 46 to the lower container 16. The secondary pressure line 326 from the secondary pilot valve 308 is connected to the valve closing chamber of the inlet valve 46 and a branch line 352 of the secondary pressure line 326 is connected to the valve opening chamber of the inlet valve 40.

The secondary pilot valve 308 for ease of illustration is shown in a vertical position in the diagrammatic view of FIGURE 6. However, it is actually installed in a horizontal position (FIGURE 3) to prevent the valve stem 314 from moving under its own weight when such movement is not desired.

In the operation of the system shown in FIGURE 6, if it be assumed that the container 14 is filling with liquid and the chamber 16 is empty (that it, the liquid is at its lowest level Z') then the system is in phase A of its operation. The flow valves 36, 46 and 58 are closed and the flow valve 40 is open so that fluid enters only the container 14 and no liquid drains from either the container 14 or 16. The primary pilot valve 150 has previously been actuated to supply pressure to the primary pressure line 302 and drain it from the primary pressure line 300. This keeps the outlet valve 36 of container 14 closed by applying pressure to its valve closing chamber and draining it from its valve opening chamber. Similarly, the primary pilot valve 150' has been actuated to supply pressure through the line 302' and drain it from the line 300' keeping the outlet valve 58 from the container 16 closed by applying pressure to its valve closing chamber and draining it from its valve opening chamber. Pressure is drained from the diaphragm assembly 306 through the branch line 304 and from the diaphragm assembly 310 through the branch line 304' causing the valve stem of the secondary pilot valve 308 to remain moved toward the diaphragm assembly 306 where it was at the end of the cycle of operation, as later described. With the secondary pilot valve 308 in this position, gas pressure from the supply line 174 enters the secondary pressure lines 326 and 352 and pressure in the secondary pressure lines 330 and 350 is drained through the secondary pilot valve 308 and out the vent 340. This holds the inlet valve 46 to the lower container 16 closed by supplying pressure to its valve closing chamber and draining it from its valve opening chamber. Inlet valve 40 to the upper container 14 is held open by the supplying of pressure to its valve opening chamber and draining it from its valve closing chamber.

In phase B of the operation, the liquid in lower container 16 is at its lowest level Z' and the liquid in the upper container 14 has reached its highest level Y. There is no change in the primary pilot valve 150' associated with the lower container 16 as the liquid level in that container has not changed. However, the primary pilot valve 150 associated with the upper container 14 is actuated upon the liquid in the container 14 reaching the predetermined upper level Y. This creates a reversal of flow of pressure in the primary pressure lines 300 and 302, and the branch line 304, causing the inlet valve 40 of the upper container 14 to close and the outlet valve 36 to open and causing the inlet valve 46 of the lower container 16 to open whereby the upper container 14 begins to drain and the lower container 16 begins to fill.

By reversing the flow in the primary pressure lines 300 and 302 from the primary pilot valve 150, the outlet valve 36 of the container 16 is opened in that pressure is applied to its valve opening chamber and is drained from its valve closing chamber. Simultaneously the diaphragm assembly 306 of the secondary pilot valve 308 is pressured through the line 304 causing the valve stem 314 in it to move downwardly, opening the secondary pressure lines 330 and 350 to pressure from the supply line 174 and draining the secondary pressure lines 326 and 352 through the vent 340 in the secondary pilot valve 308. This closes the inlet valve 40 to the container 14 by supplying pressure to its valve closing chamber and draining it from its valve opening chamber and opens the inlet valve 46 to the container 16 by pressuring its valve opening chamber and draining its valve closing chamber.

In phase C the lower container 16 is still filling and the liquid in container 14 has just reached its lowest level Z. When this occurs the outlet valve 36 from the container 14 closes preventing further draining of liquid from the container 14. The other flow valves are not operated and container 16 continues to fill. The primary pilot valve 150' is not actuated as the lower container 16 is still filling but the primary pilot valve 150 is actuated upon the liquid in the upper container 14 reaching the predetermined low level Z. This actuation of the primary pilot valve 150 reverses the flow of pressure in the primary pressure lines 300 and 302. Pressure is applied to the valve closing chamber of the outlet valve 36 and is drained from its valve opening chamber. Simultaneously pressure in the branch line 304 is drained through the primary pilot valve 150 but this causes no actuation of the secondary pilot valve 308 as the pressure in the diaphragm assembly 310 continues to be drained through the secondary pressure line 304' and the primary pilot valve 150' so that both diaphragm assemblies 306 and 310 are drained resulting in no movement of the valve stem 314.

In phase D the liquid in the upper container 14 is still at its lowest level Z and the liquid in the lower container 16 has just reached the predetermined upper level Y'. When this occurs the inlet valve 46 closes and the outlet valve 58 opens so that the liquid in the container 16 immediately begins to drain. Simultaneously, the inlet valve 40 to the upper container 14 opens allowing fluid to enter that container. The outlet valve 36 from this upper container 14 remains closed.

The primary pilot valve 150 associated with the upper container 14 is not actuated but the primary pilot valve 150' is actuated upon the liquid in the container 16 reaching its upper level Y'. This reverses the flow of pressure in the primary pressure lines 300' and 302' to pressure line 300' and drain line 302' opening the outlet valve 58 from the lower container 16. Simultaneously, the diaphragm assembly 310 is pressured through the branch primary pressure line 304' causing the valve stem 314 in the secondary pilot valve 308 to move upwardly. Upon this actuation of the secondary pilot valve 308, the secondary pressure lines 326 and 352 are pressured and the secondary pressure lines 330 and 350 are drained through the secondary pilot valve 308. This closes inlet valve 46 and opens inlet valve 40.

In phase E the liquid in the lower container 16 has reached its predetermined low level Z' and the upper container 14 is still filling. Inlet valve 40 and outlet valve 36 for the container 14 remain the same but the outlet valve 58 for the lower container 16 closes to prevent further drainage from the lower container 16. The inlet valve 46 to the lower container 16 remains closed.

When liquid in the lower container 16 reaches its predetermined low level Z', the primary pilot valve 150' is actuated, reversing the direction of flow in the primary pressure lines 300' and 302', and the branch line 304' so that line 302' is pressured and the lines 300' and 304' are drained. This closes the outlet valve 58. It also drains the diaphragm assembly 310 through the branch line 304' and out the primary pilot valve 150' but this causes no actuation of the secondary pilot valve 308 in that the other diaphragm assembly 306 has already been drained of pressure through the line 304 and out the primary pilot valve 150.

This completes the cycle.

In FIGURES 8, 9, 10, and 11 is illustrated a continuous flow metering assembly containing a modified control assembly 18a. The same vessel 10, flow valves 36, 40, 46, and 58, hydrostatic liquid level controller 70, primary pilot valves 150 and 150', and snap acting mechanism 74 are used in this modification as are used in the control assembly of FIGURES 1 through 7. The secondary pilot valves and pressure lines are different. The sequence of operation of the flow valves 36, 40, 46, and 58 is also the same as in FIGURES 1 through 7.

First and second primary pressure lines (FIGURE 9) 176 and 178 from the ports 171 and 173 respectively of the primary pilot valve 150 are connected to a secondary pilot valve 190 which is a double diaphragm double 3-way valve. The secondary pilot valve 190 (FIGURE 11) includes a generally cylindrical housing 192, a left-hand diaphragm assembly 194, and a right-hand diaphragm assembly 196. Contained in the housing 192 of this double 3-way valve is a horizontal valve stem 198 connected at its left end to the flexible diaphragm 200 in the left-hand diaphragm assembly 194 and at its right end to the flexible diaphragm 202 in the right-hand diaphragm assembly 196. Pressure lines 204 and 206 are connected to the diaphragm assemblies 194 and 196 respectively so as to apply pressure to and drain it from the outer surface of the diaphragms 200 and 202 to cause the valve stem 198 to reciprocate. Contained within the housing 192 are left and right-hand chambers 208 and 210 respectively formed by the internal shoulder 212 internally of the body 192. Mounted on the valve stem 198 in the left-hand chamber 208 is a left-hand valve stem enlargement 214 and in the right-hand chamber 210 is a right-hand valve stem enlargement 216. At the left end of the left-hand valve chamber 208 is the port for the pressure line 175 which is a branch of the pressure line 174 continuously supplying pressure to the primary pilot valve 150. At the right end of the left-hand valve chamber 208 is a port for the entrance of the primary pressure line 178 from the primary pilot valve 150. Intermediate between these two ports is a port to which is attached a secondary pressure line 220. At the left end of the right-hand valve chamber 210 is a permanent vent 222 and at the right end is a port into which is connected the primary pressure line 176 from the primary pilot valve 150. Located between these two ports is a port to which is connected a secondary pressure line 224.

As thus constructed, when the pressures on the outside of the diaphragms 200 and 202 are the same the valve stem 198 will remain motionless; when the pressure on the outside of the right-hand diaphragm 202 is greater than the pressure on the outside of the left-hand diaphragm 200 the valve stem 198 will move to the position shown in FIGURE 11; and when the pressure differentials on the diaphragms 200 and 202 are reversed the valve stem 198 will move to the right. When the valve stem 198 is in the position shown in FIGURE 11 fluid pressure entering from the primary pressure line 178 will pass through the left-hand valve chamber 208 and out the secondary pressure line 220. Pressure in line 175 will have no effect because the left-hand valve stem enlargement 214 isolates that pressure from the lines 178 and 220. Similarly, pressure from the secondary pressure line 224 will pass through the right-hand valve chamber 210 and out the primary pressure line 176 and none will be vented out the vent 222 because the right-hand valve stem enlargement 216 isolates the vent 222 from the primary pressure line 176 and the secondary pressure line 224. When the valve stem 198 is moved to the right so that the valve stem enlargements 214 and 216 are in the position shown by the dotted lines, pressure from the primary pressure line 175 will pass through the left-hand valve chamber 208 and out the secondary pressure line 220 while the primary pressure line 178 is sealed from the lines 175 and 220 by the left-hand valve stem enlargement 214. Similarly, pressure from the secondary pressure line 224 will exhaust out the vent 222 and the primary pressure line 176 will be sealed from the line 224 and vent 222 by the valve stem enlargement 216.

Thus the valve stem 198 and the valve stem enlargements 214 and 216 form a control member constructed and arranged to move between first and second positions upon alternate applications of pressure to the opposed ends of that control member. This secondary pilot valve 190 is readily available commercially and no further description of it is necessary.

The lower container 16 is similarly equipped with an identical hydrostatic head controller, primary pilot valve and secondary pilot valve which are given the same numbers primed (where illustrated), as the numbers given to the parts of the hydrostatic head controller 70, primary pilot valve 150 and secondary pilot valve 190 used with the upper container 14.

In FIGURE 10 is illustrated the modified control assembly. A branch line 236 (FIGURE 9) of the primary pressure line 178 from the primary pilot valve 150 connects to the valve opening chamber of the outlet valve 36 of the container 14 and a branch line 238 of the primary pressure line 176 from the primary pilot valve 150 is connected to the valve closing chamber of the outlet valve 36. A branch line 236' of the primary pressure line 178' connected to the primary pilot valve 150' is connected to the valve opening chamber of the outlet valve 58 for the container 16 and a branch line 238' of the primary pressure line 176' connected to the pilot valve 150' is connected to the valve closing chamber of the outlet valve 58.

The secondary pressure line 220 from the secondary pilot valve 190 connected to the valve closing chamber of the inlet valve 40 for the container 14 and the secondary pressure line 224 from the secondary pilot valve 190 is connected to the valve opening chamber of the inlet valve 40. The secondary pressure line 220' from the secondary pilot valve 190' is connected to the valve closing chamber of the inlet valve 46 of the container 16 and the secondary pressure line 224' from the secondary pilot valve 190' is connected to the valve opening chamber of the inlet valve 46.

The pressure line 204 from the diaphragm assembly 194 of the secondary pilot valve 190 is connected to the secondary pressure line 224' from the secondary pilot valve 190' and the pressure line 204' from the diaphragm assembly 194' of the secondary pilot valve 190' is connected to the secondary pressure line 224 from the primary pilot valve 190. The pressure line 206 from the diaphragm assembly 196 of the secondary pilot valve 190 is connected to the primary pressure line 178' through the branch 236' thereof and the pressure line 206' from the diaphragm assembly 196' of the secondary pilot valve 190' is connected to the primary pressure line 178 through the branch line 236 thereof.

Pressure is continuously supplied to the primary pilot valve 150 through the pressure line 174 and to the primary pilot valve 150' through the pressure line 174'. Pressure is continuously supplied to the left hand valve chambers 208 of the secondary pilot valves 190 and 190' from the pressure lines 175 and 175' respectively. The primary valves 150 and 150' are continuously vented through the vents 180 and 180' respectively and the right hand valve chambers 210 of the secondary pilot valves 190 and 190' are continuously vented through the vents 222 and 222' respectively.

In operation of the system shown in FIGURE 10 if it be assumed that container 14 is filling with liquid and chamber 16 is empty (that is the liquid is at its lowest level Z') then the system is in phase A of its operation. The flow valves 36, 46 and 58 are closed and the flow valve 40 is open so that fluid enters container 14 only and no liquid drains from either the container 14 or 16. The primary pilot valve 150 has previously been operated to supply pressure to the line 176 and drain it from the line 178. This keeps the outlet valve 36 of container 14 closed by applying pressure to the valve closing chamber through the lines 176 and 238 and draining it from the valve opening chamber through the lines 236 and 178. The valve stem in the secondary pilot valve 190 is in its downward position as viewed in FIGURE 5 and no pressure is applied to either of the diaphragm assemblies 194 and 196. With the valve stem in this position, pressure from the primary pressure line 176 passes through the secondary pilot valve 190, through the secondary pressure line 224 to the valve opening chamber of the inlet valve 40 while the valve closing chamber is drained through the secondary pressure line 220, the secondary pilot valve 190 and the vented line 178, thus holding the inlet valve 40 open. The valve stem in the secondary pilot valve 190' is in its uppermost position because the diaphragm assembly 196' is drained through lines 206', 236, and 178 while diaphragm assembly 194' is pressured through lines 204', 224 and 176. Primary pilot valve 150' has been actuated so as to pressure line 176' and vent line 178'. This applies pressure to the valve closing chamber of the outlet valve 58 of the container 16 through the branch line 238' and drains pressure from the valve opening chamber of the outlet valve 58 through the lines 236' and 178' causing the valve 58 to be closed. Inlet valve 46 is closed because the valve opening chamber in the inlet valve 46 is drained through the secondary pressure line 224', the secondary pilot valve 190', and the vent 222' and pressure is applied to the valve closing chamber of the inlet valve 46 from the pressure lines 174' and 175', through the secondary pilot valve 190' and secondary pressure line 220'.

In phase B of the operation, the liquid in the container 16 is at its lowest level Z' and the liquid in container 14 has reached its highest level Y. There is no change in the primary pilot valve 150' associated with the container 16 as the liquid level in that container has not changed. However, the primary pilot valve 150 associated with the container 14 is actuated upon the liquid in the container 14 reaching its predetermined upper level Y. This creates a reversal of flow of pressure in the primary pressure lines 176 and 178, causing inlet valve 40 of container 14 to close and outlet valve 36 to open to drain container 14 and causing inlet valve 46 to open to commence filling container 16.

When the primary pilot valve 150 is actuated pressure is applied to the valve opening chamber of the outlet valve 36 of the container 14 through the primary pressure line 178 and the branch line 236 and simultaneously pressure is drained from the valve closing chamber of the outlet valve 36 through the branch line 238 and the primary pressure line 176, causing the outlet valve 36 to open. Pressure is applied through the line 204 to the diaphragm assembly 194 of the secondary pilot valve 190 causing the valve stem therein to move upwardly (as later explained) closing the primary pressure line 176 from the secondary pressure line 224 and closing the primary pressure line 178 from the secondary pressure line 220. This allows the pressure in the secondary pressure line 224 to drain through the secondary pilot valve 190 and out the vent 222 draining pressure from the valve opening chamber of the inlet valve 40 of liquid container 14 and permits pressure from pressure line 174 and branch line 175 to pass through the secondary pilot valve 190 into the secondary pressure line 220 to apply pressure to the valve closing chamber of the inlet valve 40 closing this inlet valve 40.

The valve stem in the secondary pilot valve 190' is moved downwardly by the application of pressure to the diaphragm assembly 196' from the primary pressure line 178, the branch line 236, and the pressure line 206' while pressure is drained from the diaphragm assembly 194' through the line 204', the secondary pressure line 224, through the secondary pilot valve 190, and out its vent 222. This opens the primary pressure line 176' to the secondary pressure line 224' and connects the primary pressure line 178' to the secondary pressure line 220' through the secondary pilot valve 190'. The vent 222' and the pressure line 175' are cut off from the other lines in the secondary pilot valve 190'. With the secondary pilot valve 190' in this position, pressure from the primary pressure line 176' passes to the secondary pressure line 224' and into the valve opening chamber of the inlet valve 46 for the container 16 and pressure in the valve closing chamber of the inlet valve 46 is drained through the secondary pressure line 220', primary pressure line 178' and out the vent 180' in the primary pilot valve 150'. This opens the inlet valve to the container 16 so that fluid may enter it at the instant the inlet valve 40 to the container 14 is closed. The outlet valve 58 from the container 16 does not change position as the primary valve 150' has not been actuated.

The change of position of the valve stem in the secondary pilot valve 190' moves the valve stem in the secondary pilot valve 190 to the position previously described, that is an uppermost position, by applying pressure to the diaphragm assembly 194 through the pressure line 204, secondary pressure line 224', secondary pilot valve 190', and the primary pressure line 176'. The diaphragm assembly 196 of the secondary pilot valve 190 remains vented through the line 206, line 236', and the primary pressure line 178', as in phase A.

In phase C the container 16 is still filling and the liquid in the container 14 has reached its lowest level Z. When this occurs the outlet valve 36 from the container 14 is closed preventing further draining of liquid from the container 14. The other flow valves are not operated and container 16 continues to fill.

The primary pilot valve 150' is not actuated as the container 16 is still filling but the primary valve 150 is actuated upon the liquid in the container 14 reaching the predetermined low level Z. This actuation of the primary pilot valve 150 reverses the flow of pressure in the primary pressure lines 176 and 178. Pressure is applied to the valve closing chamber of the outlet valve 36 associated with container 14 through the primary pressure line 176 and the branch line 238 while pressure is drained from the valve opening chamber of the outlet valve 36 through the branch line 236 and the primary pressure line 178, closing this outlet valve 36. At the same time diaphragm assembly 196' of the secondary pilot valve 190' is drained through pressure line 206', the branch line 236, and primary pressure line 178. This, however, causes no movement of the valve stem in the secondary pilot valve 190' as the diaphragm assembly 194' is being vented as described with reference to phase B so the removal of pressure from the other diaphragm assembly 196' does not cause movement of the valve stem. None of the other flow valves or pilot valves are actuated.

In phase D the liquid in the container 14 is still at its lowest level Z and the liquid in the container 16 has just reached the predetermined upper level Y'. When this occurs the inlet valve 46 closes and the outlet valve 58 opens so that the liquid in that container immediately begins to drain. Simultaneously, the inlet valve 40 to the liquid container 14 opens allowing fluid to enter that container. The outlet valve 36 from this container 14 remains closed.

The primary pilot valve 150 associated with the container 14 is not actuated but the primary pilot valve 150' is actuated upon the liquid in the container 16 reaching its upper level Y. This reverses the flow of pressure in the primary pressure lines 176' and 178'. The valve opening chamber of the outlet valve 58 is pressurized through the primary pressure line 178' and the branch line 236' while its valve closing chamber is drained through the branch line 238' and the primary pressure line 176', causing the outlet valve 58 to open. The valve stem in the secondary pilot valve 190' is in its uppermost position (as later described) so that the primary pressure lines 176' and 178' are cut off from the other lines connected to the secondary pilot valve 190' while secondary pressure line 224' is connected to the vent 222' through the secondary pilot valve 190' and the secondary pressure line 220' is connected to the pressure line 175'. The inlet valve 46 to the container 16 is closed because of the application of pressure through the line 220' to the valve closing chamber of the valve 46 and the draining of pressure from the valve opening chamber of valve 46 through the secondary pressure line 224'.

The valve stem in the secondary pressure valve 190 is moved downwardly through the application of fluid pressure to the diaphragm assembly 196 from the line 206, branch line 236', and the primary pressure line 178' while the diaphragm assembly 194 is drained through the lines 204 and 224' and the secondary pilot valve 190'. Secondary pressure line 224' drains through secondary pilot valve 190' and the vented primary pressure line 176' before the valve stem in the secondary pilot valve 190' moves upwardly, and drains out the vent 222' after the valve stem moves upwardly. With the valve stem in the secondary pilot valve 190 in its lowest position the primary pressure line 176 is connected to the secondary pressure line 224 and the primary pressure line 176 is connected to the secondary pressure line 224 and the primary pressure line 178 is connected to the secondary pressure line 220 through the secondary pilot valve 190 while the pressure line 175 and vent 222 are sealed from the other lines in this secondary pilot valve 190.

Diaphragm assembly 194' of the secondary pilot valve 190' is pressurized through the line 204', the secondary pressure line 224, and the primary pressure line 176 causing the valve stem in the secondary pilot valve 190' to move upwardly (as previously described) since the diaphragm assembly 196' has previously been drained in phase C through the line 206', the branch line 236, and the primary pressure line 178. Likewise, pressure on the diaphragm assembly 194 of the secondary pilot valve 190 is drained through the line 204, the secondary pressure line 224' and the vent 222'.

The valve opening chamber of the inlet valve 40 of container 14 is pressurized through secondary pressure line 224 and primary pressure line 176 while the valve closing chamber is drained through the secondary pressure line 220 and the primary pressure line 178 causing the inlet valve 40 to open. No change occurs in the outlet valve 36 as the pressure to it is not changed.

In phase E the liquid in the container 16 has reached its lower predetermined level Z' and the container 14 is still filling. The inlet valve 40 and the outlet valve 36 for container 14 remain the same but the outlet valve 58 for container 16 closes to prevent further draining of liquid from the container 16. The inlet valve 46 to the container 16 remains closed.

When liquid in the container 16 reaches its predetermined low level Z', the primary pilot valve 150' is actuated reversing the direction of fluid flow in the primary pressure lines 176' and 178'. Pressure to the valve closing chamber of outlet valve 58 is applied from the primary pressure line 176' and the branch line 238' while the valve closing chamber is drained through the branch line 236' and the primary pressure line 178' causing this outlet valve 58 to close. Pressure is drained from the diaphragm assembly 196 of the secondary pilot valve 190 through the line 206, the branch line 236', and the primary pressure line 178'. However, the valve stem of the secondary pilot valve 190 is not actuated as the pressure from the diaphragm assembly 194 has already been drained as described in phase D resulting in there being no pressure differential to move the valve stem upward.

This completes the cycle.

If desired there may be omitted that portion of the primary pressure line 178 between its point of connection with the branch line 236 and the secondary pilot valve 190 as this line never supplies pressure through the secondary pilot valve 190—it only drains it. A similar portion of the primary pressure line 178' may likewise be omitted.

Referring now to FIGURES 14 and 15 there is illustrated a further modification of the control assembly of FIGURES 1 through 7 in which modification all equipment is identical to that shown in FIGURES 8, 9, 10, and 11 except the secondary pilot valves (190 and 190' in FIGURES 9, 10, and 11) and the arrangement of various pressure lines. The secondary pilot valves 250 and 250' used in the control assembly illustrated in FIGURE 14 are best illustrated in FIGURE 15 where a secondary pilot valve 250 is illustrated. This modified secondary pilot valve 250 is a double diaphragm 3-way valve and is similar to the secondary pilot valve 190 of FIGURE 11 except that the left hand valve chamber 208, the left hand valve stem enlargement 214, and the ports for pressure lines 175, 178 and 220 are omitted.

The secondary pilot valve 250 includes a generally cylindrical housing 252, a left hand diaphragm assembly 254, and a right hand diaphragm assembly 256. Contained in the housing 252 of this 3-way valve is a horizontal valve stem 258 connected at its left end to the flexible diaphragm 260 in the left hand diaphragm assembly 254 and at its right end to the flexible diaphragm 262 in the right hand diaphragm assembly 256. Pressure lines 264 and 266 are connected to the diaphragm assemblies 254 and 256 respectively so as to apply pressure to and drain it from the outer surfaces of the diaphragms 260 and 262 to cause the valve stem 258 to reciprocate. Contained within the housing 252 is the valve chamber 268. Mounted on the valve stem 258 in the valve chamber 268 is a valve stem enlargement 270. At the left end of the valve chamber 268 is a vent 272 and at the right end is a port for the entrance of the primary pressure line 274. Intermediate between this vent and the port is another port to which is attached a secondary pressure line 276.

As thus constructed, when pressures on the outside of the diaphragm 260 and 262 are the same, the valve stem 258 will remain motionless; when the pressure on the outside of the right hand diaphragm 262 is greater than the pressure on the outside of the left hand diaphragm 260 the valve stem 258 will move to the left hand position shown in FIGURE 15; and when the pressure differentials on the diaphragms 260 and 262 are reversed the valve stem 258 will move to the right. When the valve stem 258 is in the position shown in FIGURE 15, fluid pressure entering the primary pressure line 274 will pass through the valve chamber 268 and out the secondary pressure line 276 while the vent 272 is sealed from these lines by the valve stem enlargement 270. When the valve stem 258 is moved to the right, pressure from the secondary pressure line 276 will drain out the vent 272 while the line 274 will be isolated from the vent 272 and the pressure line 276 by the valve stem enlargement 270.

Referring now to FIGURE 14, the primary pressure line 274 is connected to the port 171 of the primary pilot valve 150 and the secondary pilot valve 250. A branch line 280 of this primary pressure line 274 is connected to the valve closing chamber of the outlet valve 36 in the outlet line 34 of container 14. The pressure line 282 is connected to port 173 of the primary pilot valve 150 and by the branch lines 284 and 286 to the valve opening chamber of the outlet valve 36. The primary pressure line 282 is also connected by a branch line 288 to the valve closing chamber of the inlet valve 40 in the inlet line 38 to container 14. The secondary pressure line 276 communicates between the secondary pilot valve 250 and the valve opening chamber of the inlet valve 40.

Similarly, the primary pressure line 274' connects the port 171' in primary pilot valve 150' with the secondary pressure valve 250' and the branch line 280' from the primary pressure line 274' is connected to the valve closing chamber of the outlet valve 58 in the outlet line 56 from container 16. A primary pressure line 282' is connected between the port 173' and the primary pilot valve 150' and by branch lines 284' and 286' to the valve opening chamber in the outlet valve 58. A branch line 288' connected to primary pressure line 282' is connected to the valve closing chamber of the inlet valve 46. The valve opening chamber of inlet valve 46 is connected by the secondary line 276' to the secondary pilot valve 250'.

The diaphragm assembly 256 of the secondary pilot valve 250 is connected through the pressure line 266 to the pressure line 284', and the pressure line 264 from the diaphragm assembly 254 is connected to the secondary pressure line 276' from the secondary pilot valve 250'. The pressure line 266' from the diaphragm assembly 256' of the secondary pilot valve 250' is connected to the branch line 284, and the pressure line 264' of the diaphragm assembly 254' is connected to the secondary pressure line 276 from the secondary pilot valve 250.

Pressure is continuously supplied to the primary pilot valves 150 and 150' through the pressure lines 174 and 174' respectively, and primary pilot valves 150 and 150' are continuously vented by the vents 180 and 184' respectively. Pressures are alternately supplied to and drained from the secondary pilot valves 250 and 250' through the lines 274 and 274' respectively from the primary pilot valves 150 and 150' respectively.

In operation of the modified control assembly of FIGURE 14 the flow valves 36, 40, 46, and 58 are operated in exactly the same sequence as in the control assembly of FIGURE 6, but they are operated in a different manner.

In operation of the system shown in FIGURE 14 if it be assumed that the liquid in the container 16 is at its lowest level Z' and the container 14 filling, then the system is in phase A. In this phase flow valves 36, 46, and 58 are closed and flow valve 40 is open.

The primary pressure line 274 is pressurized and the primary pressure line 282 is vented so that pressure is applied through the branch line 280 to the valve closing chamber of the outlet valve 36 and drained from its opening chamber through the branch lines 286 and 284 and the vented primary pressure line 282. This keeps the outlet valve 36 closed. As later explained, the valve stem in secondary pilot valve 250 is in its lowest position and in secondary pilot valve 250' is in its uppermost position. Pressure in the primary pressure line 274 thus passes through the secondary pilot valve 250 into the secondary pressure line 276 to the valve opening chamber of the inlet valve 40 while pressure from the valve closing chamber of valve 40 drains through the branch line 288 and out the vented primary pressure line 282. This holds valve 40 open.

The primary pressure line 274' is pressurized and the primary pressure line 282' is drained through the primary pilot valve 150'. This applies pressure through the lines 274' and 280' to the valve closing chamber of the outlet valve 58 while pressure from the valve opening chamber of the outlet valve 58 drains through the branch lines 286' and 284' and the vented primary pressure line 282'. The inlet valve 46 is held closed by the valve closing spring 5 in its valve closing chamber as the pressure in its valve closing chamber is drained through the lines 288' and 282' while the pressure in the valve opening chamber is drained through the secondary pressure line 276' and the secondary pilot valve 250' at its vent 272'.

The valve stem in secondary pilot valve 250 is in its lowermost position and remains there as pressure is drained from both diaphragm assemblies 254 and 256 so there is no pressure differential to move the valve stem. The diaphragm assembly 256 is drained through lines 266, 284' and 282' while the diaphragm assembly 254 is drained through the lines 264 and 276', the secondary pilot valve 250', and the vent 272'. The valve stem in the secondary pilot valve 250' is held in its uppermost position by pressure on the diaphragm assembly 254' from the line 264' connected to the line 276 which is pressured and pressure is drained from the diaphragm assembly 256' through the lines 266', 284, and 282.

In phase B, the liquid in the container 16 is still at its lowest level Z' and the liquid in the container 14 has reached its upper level Y. The inlet valve 40 to the container 14 is closed and the outlet valve 36 is opened so that liquid in the container 14 begins to drain. The inlet valve 46 to container 16 is opened while the outlet valve 58 remains closed resulting in the container 16 beginning to fill.

The primary pilot valve 150' is not actuated in this phase B but the primary pilot valve 150 is actuated reversing the pressure flow in lines 274 and 282 so that the primary pressure line 274 is drained and the primary pressure line 282 is pressured. The valve closing chamber of the outlet valve 36 is drained through lines 280 and 274 and the valve opening chamber is pressured through lines 282, 284, and 286 opening this valve 36 so that liquid in the container 14 drains. Simultaneously pressure is applied through the lines 282 and 288 to the valve closing chamber of the inlet valve 40 and pressure is drained from the valve opening chamber of the inlet valve 40 through the secondary pressure line 276 and secondary pilot valve 250 and, before the valve stem in secondary pilot valve 250 has moved upwardly as later described, through the vented primary pressure line 274 and, after the valve stem in the secondary pilot valve 250 has moved upwardly, through the vent 272. This closes the inlet valve 40 so that no more fluid enters the container 14. Pressure is drained from the diaphragm assembly 254' in the secondary pilot valve 250' through the pressure lines 264' and 276 and through the secondary pilot valve 250 as previously described with relation to the draining of pressure from the valve opening chamber of the inlet valve 40. The diaphragm assembly 256' of the secondary pilot valve 250' is pressured through the lines 266', 284 and 282. This causes the valve stem in the secondary pilot valve 250' to move to its lowermost position so that the lines 274' and 276' communicate through the secondary pilot valve 250'. With the valve stem in the secondary pilot valve 250' in its lowermost position, the diaphragm assembly 254 in secondary pilot 250 is pressured through the lines 264 and 276', the secondary pilot valve 250', and primary pressure line 274'. The diaphragm assembly 256 of the secondary pilot valve 250 remains drained through the lines 266, 284' and 282'. Because of the pressure differentials in these diaphragm assemblies 254 and 256 the valve stem in secondary pilot valve 250 moves upwardly placing the secondary pressure line 276 in communication with the vent 272.

Pressure is applied to the valve opening chamber of the inlet valve 46 through the line 276', the secondary pilot valve 250', and the primary pressure line 274' while the valve closing chamber of valve 46 remains drained through the lines 288' and 282'. This opens inlet valve 46 so that fluid enters the lower container 16. Outlet valve 58 remains closed in that pressure is still applied to its valve closing chamber through the lines 280' and 274 while pressure is drained from its valve opening chamber through the lines 286', 284', and 282'. The container 16 now begins to fill while the container 14 drains.

In phase C the liquid in the container 14 has reached its lowest level Z while the container 16 is still filling. The primary pilot valve 150' is not actuated but the primary pilot valve 150 is reversing the flow of fluid pressure in the lines 274 and 282 and causing outlet valve 36 to close so that no more liquid leaves the container 14. None of the other flow valves, 40, 46, and 58 are actuated. Flow valve 36 is closed because pressure in the line 274 passes through the line 280 to the valve closing chamber of the outlet valve 36 while pressure in its valve opening chamber drains through the lines 286, 284, and 282. The diaphragm assembly 256' of the secondary pilot valve 250' is drained of pressure through the lines 266', 284 and 282. This causes no movement of the valve stem in the secondary pilot valve 250' as the diaphragm assembly 254' also continues to be drained of pressure. Pressure is drained from the valve closing chamber of the inlet valve 40 through the lines 288 and 282 but there is no actuation of this valve 40 as it is continued to be held closed by the spring 5 in the valve closing chamber and its valve opening chamber continues to be drained through the secondary pressure line 276 and the vent 272.

In phase D the liquid in the container 16 has reached its upper level Y' and the liquid in that container commences to drain while the container 14 commences to fill. To accomplish this the flow valves 40, 46, and 58 are reversed from what they were at phase C but the outlet valve 36 remains closed so that the container 14 may fill. The primary pilot valve 150 is not actuated as that valve was actuated when the container 14 emptied in phase C. The primary pilot valve 150' is actuated by the filling of the container 16, reversing the flow of pressure in the primary pressure lines 274' and 282'.

The outlet valve 58 in the flow line 56 from the container 16 is opened by the draining of pressure from the valve closing chamber of the outlet valve 58 through the lines 280' and 274' and the application of pressure to the valve opening chamber of the outlet valve 58 through the lines 282', 284' and 286'. Pressure is drained from the valve opening chamber of the inlet valve 46 through the secondary pressure line 276', the secondary pilot valve 250', and, before the valve stem in secondary pilot valve 250' moves upwardly as later described, through the primary pressure line 274' and, after the valve stem in secondary pilot valve 250' has moved upwardly as later described, out the vent 272'. This closes inlet valve 46.

Pressure is applied to the diaphragm assembly 256 of secondary pilot valve 250 through the lines 266, 284', and 282' and simultaneously pressure is drained from the diaphragm assembly 254 of the secondary pilot valve 250 through the lines 264 and 276' and through the secondary pilot valve 250' in the same manner as it is drained from the valve opening chamber of the inlet valve 46. This causes the valve stem in the secondary pilot valve 250 to move downward so that the primary pressure line 274 is connected with the secondary pressure line 276 through secondary pilot valve 250. Because the primary pressure line 274 from pilot 150 is pressured this pressures line 264' and diaphragm assembly 254' in secondary pilot valve 250' while the diaphragm assembly 256' of the secondary pilot valve 250' is drained through the lines 266', 284 and 282 resulting in the valve stem in secondary pilot valve 250' moving upward, communicating the secondary pressure line 276' with the vent 272.

The pressure in the secondary pressure line 276 also pressures the valve opening chamber of the inlet valve 40 while pressure from the valve closing chamber of inlet valve 40 is drained through the lines 288 and 282 causing valve 40 to open allowing fluid to enter the container 14. As the pressure has not been reversed in the lines 274 and 282 the outlet valve 36 remains closed so no liquid can leave the upper container 14.

In phase E, the container 14 continues to fill and liquid in the container 16 has just reached its lowest level Z'. Only the outlet valve 58 is actuated. It is closed so that no more liquid leaves the container 16. No liquid enters container 16 as its inlet valve 46 remains closed. The inlet valve 40 remains open and the outlet valve 36 remains closed so the container 14 continues to fill.

The outlet valve 58 is closed by actuation of the primary pilot valve 150' which reverses the direction of pressure in the lines 274' and 282'. Pressure is applied through lines 274' and 280' to the valve closing chamber of the outlet valve 58 while pressure is drained from the valve closing chamber of the outlet valve 58 through the lines 286', 284' and 282' closing this outlet valve 58. The valve closing chamber of inlet valve 46 is drained of pressure through the lines 288' and 282' but this causes no actuation of that valve as its valve opening chamber continues to be drained through the line 276' and the vent 272' in the secondary pilot valve 250' and the valve closing spring 5 in the inlet valve 46 holds the valve 46 closed. Pressure is also drained from the diaphragm assembly 256 of the secondary pilot valve 250 through the lines 266, 284' and 282' but this causes no movement of the valve stem in the secondary pilot valve 250 as pressure from the other diaphragm assembly 254 continues to be drained through lines 264 and 276' and the vent 272' of the secondary pilot valve 250'. Thus there is no difference in pressures on the diaphragm assemblies 256 and 254 so the valve stem in secondary pilot valve 250 will not move.

The cycle is thus completed.

In the control system illustrated in FIGURES 6, 10, and 14 the primary pilot valves 150 and 150' and the flow valves 36, 40, 46, and 58 operate in the same sequence and the flow valves are all closed by both the application of fluid pressure to their valve closing chambers and the force of the springs 5. Because all the flow valves are closed by both the action of a spring and fluid pressure while they are opened by the application of fluid pressure alone, these valves will close slightly quicker than they will open. This creates an overlapping effect increasing the accuracy of the metering by preventing an inlet and an outlet valve of the same container being open at the same time.

In the control system illustrated in FIGURE 14 the inlet valves 40 and 46 are not always held closed (after the initial closing) by continued application of fluid pressure to their valve closing chambers. The inlet valves 40 and 46 are sometimes held closed (after initial closing) solely by the force of the spring 5 in the valve closing chamber. However, in the control systems illustrated in FIGURES 6 and 10 the flow valves are always held in position by the application of fluid pressure to the valve closing chamber or valve opening chamber.

If desired, the pressure lines to the valve closing chambers of the flow valves 36, 40, 46 and 58 in the control system of FIGURES 6 and 14 may be omitted and all the flow valves will be closed solely by the force of the springs 5 in their valve closing chambers and will be held closed by those same springs. In the control systems of FIGURES 6 and 10 all springs in the flow valves may be omitted as the flow valves in those control systems, when closed, are always held closed by the application of fluid pressure to the valve closing chambers. However, with the omission of the springs from the flow valves in the control systems illustrated in FIGURES 6 and 10 there will not be the overlapping action of the valves previously described except for those flow valves which are mounted as illustrated in FIGURE 7 so that the weight of the diaphragm 3 tends to close the valve and the pressure of liquid in the line controlled by the flow valve does not urge the valve open.

It is obvious that the control systems of FIGURES 6, 10, and 14 may be used to control fluid flow into and from containers other than those of the type illustrated in FIGURE 1 and that the primary pilot valves 150 and 150′ do not need to be actuated by the particular snap acting mechanism 74 illustrated.

For ease of illustration the secondary pilot valves 190, 190′, 250, and 250′ are shown diagrammatically in FIGURES 10 and 14 in a vertical position. However, all these valves are actually installed in a horizontal position (see FIGURE 9 for secondary pilot valve 190) to prevent their stems from moving under their own weight when such movement is not desired.

In operation of the continuous flow separating and metering assembly illustrated in FIGURES 1, 2, 3, and 4, including any of the control system of FIGURES 6, 10, or 14, fluids containing both liquids and gases are supplied at the common inlet line 60. Assuming that the cycle of operation begins with phase A, the liquid in the lower container 16 will be at its predetermined low level Z′ and the liquid in the upper container 14 will be between the lower and upper predetermined levels Y and Z with fluid entering the container 14. Both the inlet valve 46 and outlet valve 58 in the flow lines to the container 16 are closed so that no fluid enters and no liquid leaves this container. The inlet valve 40 to the upper container 14 is open so that fluid enters this upper container 14. The liquid outlet valve 36 from the upper container 14 is closed so that no liquid leaves it. As the fluids enter the upper container above the liquid in that container the liquids and gases are separated by gravity with the gas passing out the gas outlet line 30 against the back pressure valve 32. The fluids continue to enter the upper container 14 until the liquid in the container 14 reaches the predetermined upper level Y at which point phase B commences.

The weight of the liquid exerted against the lower surface of the diaphragm 86 of the diaphragm assembly 72 moves the adjustable engaging member 140 upwardly causing the snap acting mechanism 74 to actuate the primary pilot valve 150, simultaneously causing the inlet valve 40 to close, the outlet valve 36 to open, and the inlet valve 46 to open. Closing of the inlet valve 40 prevents any further fluid from entering the upper container 14 opening of the outlet valve 36 allows the liquid in the upper container 14 to drain out the common liquid outlet line 62. At the instant the inlet valve 40 is opened and the liquid outlet valve 36 is closed the counter 81 is actuated to record this. The fluids that previously passed into the upper container 14 now pass into the lower container 16 where the fluids separate by gravity into liquids and gasses with the gas passing up the passage 54 and out the gas outlet line 30 and the liquids collecting in the lower container 16.

The lower container 16 continues to fill while the upper container 14 continues to drain but because the containers 14 and 16 drain faster than they fill with liquid the liquid in container 14 will reach the predetermined low level Z before the liquid in the lower container 16 reaches the predetermined upper level Y′. When the liquid in the upper container 14 reaches the predetermined low level Z the force of the weight of the liquid against the lower surface of the diaphragm 86 in the hydrostatic head controller 70 of the upper container 14 will decrease to the point where the spring 102 moves the adjustable engaging member 140 downwardly sufficient to actuate the snap acting mechanism 74, actuating the primary pilot valve 150, and commencing operation of phase C. By this actuation of the primary pilot valve 150 the outlet valve 36 is closed so that the upper container 14 does not drain of any more liquid.

Well fluids continue to enter the lower container 16 until the liquids in the lower container reach the predetermined upper level Y′ at which time the system enters phase D. The hydrostatic head of the liquid in the lower container 16 causes the primary pilot valve 150′ to be actuated which causes the simultaneous closing of the inlet valve 46, opening of the outlet valve 58, and opening of the inlet valve 40. At the same time the counter associated with the lower container 16 is actuated recording this action. This operation of the flow valves stops all further fluid from entering the lower container 16 and commences the draining of the liquid from the lower container 16. At the same time the fluids from the common inlet line 60 enter the upper container 14 where the liquids are retained because the outlet valve 36 is closed.

Fluids continue to enter the upper container 14 while liquids continue to drain from the lower container 16 until the liquid in the lower container 16 reaches the predetermined low level Z′ at which time the spring in the hydrostatic head liquid level controller 70′ associated with the lower container 16 overcomes the force of the weight of the liquid on the lower side of the diaphragm and actuates the primary pilot valve 150′. Phase E has just commenced. This actuation of the primary pilot valve 150′ closes the outlet valve 58 so that no more liquid leaves the lower container 16.

The cycle is then completed.

With the separating and metering assembly of the present invention there is a continuous flow of fluids into the vessel 10 with the fluid flow being first directed to an upper container 14 and then to a lower container 16. In each container 14 and 16 both separating and metering takes place without the necessity of draining the liquid from a separating container to a separate metering container for metering.

With the liquid containers 14 and 16 being placed one on top of the other and connected by the gas passage 54 the separating and metering assembly of the present invention, without reducing the degree of separation, can handle much greater throughputs than the vertical partition type of separator and meter in which a vessel is divided by a vertical partition into two halves with each half being a separating and metering container. This result is due to two features of the present invention. The first is that the present invention has twice the liquid surface area and one-half the liquid depth for a given volume of vessel than the vertical partition type of separating and metering assembly. With twice the liquid surface area and one-half the liquid depth for a given volume of liquid, the gases trapped in the liquid escape much faster than they do from liquid having twice the depth and half the surface. This advantage is especially important where foaming liquids are being handled.

The second feature is that in the present invention the incoming gases enter the separating chambers at the full cross-sectional area of the vessel 10 rather than at the one-half cross-sectional area of the vertical partition type. Thus the present invention can handle twice the volume of gases as the vertical partition type with approximately the same degree of separation of liquid from the gases because the present separating chambers utilizing the full cross-sectional area of the vessel 10 can receive twice the volume of gas as one-half the cross-sectional area and still reduce the incoming gas to the same velocity within the separating chamber. By having the same velocity in the separating chambers the apparatuses will have approximately the same rate of separation of liquid from gas per unit of volume.

In the event that the flow control means to assure that the emptying container, either 14 or 16, empties before the filling container fills, should be omitted or should fail in operation so that the filling container, either 14 or 16, should fill before the emptying container empties, the separating and metering assembly will still function with the only change in operation being that the flow to the vessel 10 will not be continuous. This flow will be interrupted for the time that it takes the emptying container to empty after the filling container has filled.

Referring now to FIGURES 12 and 13 there is illustrated a continuous flow separating and metering assembly which is identical in construction and operation to that illustrated in FIGURE 1 except that a float assembly is used to actuate the primary pilot valve 150 rather than the hydrostatic head controller 70. The hydrostatic head controller 70 is preferable when foaming liquids are encountered but both it and the float assembly are satisfactory where non-foaming liquids are metered.

With the use of the hydrostatic head controller 70 illustrated in FIGURE 3, the weight of the liquid in the containers 14 and 16 operated the snap acting mechanism 74 which actuated the primary pilot valve 150. However, with the float assembly of FIGURES 12 and 13 the swinging movement of a float arm 400 caused by the vertical movement of a float 402 rigidly secured to the float arm 400 as the float 402 moves with changing liquid levels, operates modified snap acting mechanism 74a to operate the primary pilot valve 150.

Referring now to FIGURE 13 there is illustrated a modified snap acting mechanism 74a with the entire structure illustrated in FIGURE 11 being illustrated in United States Patent No. 2,818,738, granted January 8, 1958, to H. V. Smith, et al., for a Snap Acting Mechanism. This structure is located within the case 51b (FIGURE 12). In this modified snap acting mechanism 74a a rock shaft 404 is mounted for oscillating rotatable movement in a tubular nozzle 406 closed at one end and opening at the other into the upper container 14. This rock shaft 404 is pivotally mounted and is oscillatably rotated by movement of the float arm 400 as the float 402 rises and falls with changes in liquid level. An engaging member 408 is rigidly secured to the end of the rock shaft 404 for rotation therewith and includes a pair of bracket arms 410. Disposed near the free end 412 of each bracket arm 410 is a set screw 414 by which suitable adjustment may be made for calibrating the snap acting mechanism 74a as will be presently described. Rotatably secured at its upper end to the rock shaft 404 and extending downwardly between the bracket arms 410 and contact screws 414 is a swing arm 416. The remainder of the snap acting mechanism 74a between the pin 160 at the lower end of the swing arm 416 and the primary valve 150 is identical in construction and operation to the snap acting mechanism 74 illustrated in FIGURE 4.

A dump counter or recording mechanism 420 is provided to keep an accurate count of each time the liquid container fills and empties. The dump counter or recorder mechanism 420 includes a conventional counter 422 having its actuator arm 424 secured by a tension spring 426 to the end of an arm 428 which is rigidly secured to the rock shaft 404 and oscillates therewith so that oscillations of the arm 428 through the action of the spring 426 causes oscillations of the actuator arm 424 recording the number of times the liquid container 14 empties and fills.

In operation of the modification illustrated in FIGURES 12 and 13 when the liquid in the container 14 reaches the predetermined low level Z so that the float is in the position illustrated in FIGURE 12, the float arm 400 will have rotated the rock arm 404 sufficiently to cause the right hand adjusting screw 414 to contact the swing arm 416 and move it to the left to the position shown in FIGURE 13 causing actuation of the primary pilot valve 150 in the same manner as movement of the swing arm 142 in FIGURE 4 actuates the pilot valve 150. Similarly, when the liquid level in container 14 reaches the upper predetermined level Y causing the float 402 and float arm 400 to assume the dotted position shown in FIGURE 12, the float arm 400 will rotate the rock shaft 404 until the left hand contact screw 414 has contacted the swing arm 416 and moved it sufficiently to the right to actuate the primary pilot valve 150 in the same manner as the primary pilot valve 150 in FIGURE 4 was actuated by the movement of the swing arm 142 illustrated there.

By adjustment of the adjusting screws 414 the amount of swing of the float arm 400 necessary to actuate the primary pilot valve 150 can be adjusted.

No further description is believed necessary of this snap acting mechanism.

The present invention, therefore, is well suited to carry out the objects and attain the advantages and ends mentioned as well as others inherent therein. Rearrangements of parts and substitutions of parts will suggest themselves to those skilled in the art and accordingly, the invention is to be limited only by the spirit thereof and the scope of the appended claims.

What is claimed is:

1. In a control system for directing a flow of fluid alternately into and from first and second containers through an inlet and an outlet flow line connected to each of said containers, the improvement comprising; an inlet flow valve element in each inlet flow line and an outlet flow valve element in each outlet flow line, each said flow valve element having a valve opening and a valve closing chamber so constructed and arranged that application of fluid pressure to the valve opening chamber opens the flow valve element and exhausts fluid pressure from the valve closing chamber and the application of fluid pressure to the valve closing chamber closes the flow valve element and exhausts fluid pressure from the valve opening chamber; a primary pressure system including first and second primary pilot valves associated with said first and second containers respectively, each of said primary pilot valves adapted to simultaneously direct fluid pressure to a first primary pressure line and drain it from a second primary pressure line when liquid in each of the respective containers reaches a predetermined upper level and to simultaneously direct fluid pressure to the second primary pressure line and drain it from the first primary pressure line when the liquid reaches a predetermined low level, one of the first primary pressure lines communicating between said first primary pilot valve and the valve opening chamber of the outlet flow valve element in the flow line connected to the first container, one of the second primary pressure lines communicating between the first primary pilot valve and the valve closing chamber of said last mentioned flow valve element, another first primary pressure line communicating between the second primary pilot valve and the valve opening chamber of the outlet flow valve element in the outlet line connected to the second container, and another second primary pressure line communicating between the second primary pilot valve and the valve closing chamber of said last mentioned outlet valve element; and a secondary pressure system including a pressure operated secondary pilot valve adapted in a first position to simultaneously direct fluid pressure to a first secondary pressure line and drain it from a second secondary pressure line and in a second position to simultaneously direct fluid pressure to the second secondary pressure line and drain it from the first secondary pressure line, a control member in said secondary pilot valve constructed and arranged to move said secondary pilot valve between said first and second positions upon alternate application of fluid pressure to opposed portions of said control member, the first secondary pressure line communicating between said secondary pilot valve and the valve closing chamber of the inlet flow valve element in the inlet line to the first container and the valve opening chamber of the inlet flow valve element in the inlet line to the second container, the second secondary pressure line communicating between said secondary pilot valve and the valve closing chamber of said last mentioned inlet flow valve element and the valve opening chamber of the inlet flow element in the inlet line to the first container, a pressure line communicating between one of said opposed portions of the control member of the secondary pilot valve and the first primary pressure line from the first primary pilot valve, and a pressure line communicating between the other opposed portions of the control member of the secondary pilot valve and the first primary pressure line from the second primary pilot valve.

2. The improvement of claim 1 in which each of the inlet valve elements and outlet valve elements include spring means assisting the closing of said valve elements.

3. In a control system for directing a flow of fluid alternately to and from first and second containers through an inlet and an outlet flow line connected to each of said containers, the improvement comprising; a pressure responsive inlet flow valve element in each inlet line and a pressure responsive outlet flow valve element in each outlet line, each such flow valve element being so constructed and arranged as to be normally closed but opened by the application of fluid pressure; a primary pressure system including a first and a second primary pilot valve associated with each said first and second containers, respectively, each of said primary pilot valves adapted to direct fluid pressure to a primary pressure line when liquid in each of the respective containers reaches a predetermined upper level and to drain fluid pressure from the primary pressure line when the liquid reaches a predetermined low level, one of the primary pressure lines communicating between said first primary pilot valve and the outlet flow valve element in the flow line connected to the first container, another primary pressure line communicating between the second primary pilot valve and the outlet flow valve element in the outlet line connected to the second container; and a secondary pressure system including a pressure operated secondary pilot valve adapted in the first position to simultaneously direct fluid pressure to a first secondary pressure line and drain it from a second secondary pressure line and in a second position to simultaneously direct fluid pressure to the second secondary pressure line and drain it from the first secondary pressure line, a control member in said secondary pilot valve constructed and arranged to move said secondary pilot valve between said first and second positions upon alternate application of fluid pressure to opposed portions of said control member, the first secondary pressure line communicating between said secondary pilot valve and the inlet flow valve element in the inlet line to the second container, the second secondary pressure line communicating between said secondary pilot valve and the inlet flow valve element in the inlet line connected to the first container, a pressure line communicating between one of said opposed portions of the control member of the secondary pilot valve and the primary pressure line from the first primary pilot valve, and a pressure line communicating between the other opposed end portion of the control member of the secondary pilot valve and the primary pressure line from the second primary pilot valve.

4. In a control system for directing a flow of fluid alternately to and from first and second containers through an inlet and an outlet flow line connected to each of said containers, the improvement comprising; a pressure responsive inlet flow valve element in each inlet line and a pressure responsive outlet flow valve element in each outlet line, each such flow valve element being so constructed and arranged as to be normally closed but opened by the application of fluid pressure; a primary pressure system including a first and a second primary pilot valve associated with said first and second containers, respectively, each of said primary pilot valves adapted to simultaneously direct fluid pressure to a first primary pressure line and drain it from a second primary pressure line when liquid in each of the respective containers reaches a predetermined upper level and to simultaneously direct the fluid pressure to the second primary pressure line and drain it from the first primary pressure line when the liquid reaches a predetermined low level, one of the first primary pressure lines communicating between said first primary pilot valve and the outlet flow valve element in the flow line connected to the first container, another first primary pressure line communicating between the second primary pilot valve and the outlet flow valve element in the flow line connected to the second container; and a secondary pressure system including pressure operated secondary pilot valves each adapted in a first position to direct fluid pressure to a secondary pressure line and in a second position to drain fluid from said secondary pressure line, a movable control member in each said secondary pilot valve constructed to move said secondary pilot valve between said first and second positions upon alternate application of fluid pressure to opposed portions of said control member, one of the secondary pressure lines communicating between the first secondary pilot valve and the inlet flow valve element in the inlet line connected to the first container, another secondary pressure line communicating between the second secondary pilot valve and the inlet flow valve element in the inlet line connected to the second container, a pressure line communicating between one of said opposed portions of the control member of the first secondary pilot valve and the secondary pressure line from the second secondary pilot valve, a pressure line communicating between the other opposed portion of the control member of the first secondary pilot valve and the primary pressure line from the second primary pilot valve, a pressure line communicating between one of said opposed portions of the control member of the second secondary pilot valve and the secondary pressure line from the first secondary pilot valve, and a pressure line communicating between the other opposed portion of the control member of the second secondary pilot valve and the primary pressure line from the first primary pilot valve.

5. The improvement of claim 4 in which each flow valve element includes a valve opening chamber so constructed and arranged that the application of fluid pressure to the valve opening chamber opens the flow valve element and in which improvement the pressure lines connected to the flow valve elements are connected to the flow valve elements at their valve opening chambers.

6. In a control system for directing a flow of fluid alternately into and from first and second containers through an inlet and an outlet flow line connected to each of said containers, the improvement comprising; an inlet flow valve element in each inlet flow line and an outlet flow valve element in each outlet flow line each said flow valve element having a valve opening and a valve closing chamber so constructed and arranged that application of fluid pressure to the valve opening chamber opens the valve element and exhausts fluid pressure from the valve closing chamber and application of fluid pressure to the valve closing chamber closes the valve element and exhausts fluid pressure from the valve opening chamber, each said valve element including resilient means assisting the closing of said valve element; a primary pressure system including a first and a second primary pilot valve associated with said first and second containers respectively, each of said primary pilot valves adapted simultaneously to direct fluid pressure to a first primary pressure line and drain it from a second primary pressure line when liquid in each of the respective containers reaches a predetermined upper level and to simultaneously direct fluid pressure to the second primary pressure line and drain it from the first primary pressure line when the liquid reaches a predetermined low level, one of the first primary pressure lines communicating between said first primary pilot valve and both the valve opening chamber of the outlet flow valve element and the valve closing chamber of the inlet flow valve element in the flow line connected to the first container, one of the second primary pressure lines communicating between the first primary pilot valve and the valve closing chamber of the last mentioned outlet flow valve element, another first primary pressure line communicating between the second primary pilot valve and both the valve opening chamber of the outlet flow valve element and the valve closing chamber of the inlet flow valve element in the flow lines connected to the second container, and another second primary pressure line communicating between the second primary pilot valve and the valve closing chamber of the last mentioned outlet flow valve element, and a secondary pressure system including, first and second pressure operated secondary pilot valves each adapted in a first position to direct fluid pressure to a secondary pressure line and in a second position to drain fluid from said secondary pressure line, a movable control member in each secondary pilot valve constructed and arranged to move said secondary pilot valve between said first and second positions upon alternate application of fluid pressure to opposed portions of said control member, one of the secondary pressure lines communicating between the first secondary pilot valve and the valve opening chamber of the inlet flow valve element in the inlet line connected to the first container, another secondary pressure line communicating the second secondary pilot valve and the valve opening chamber of the inlet flow valve element in the inlet flow line connected to the second container, a pressure line communicating between one of said opposed portions of the control member of the first secondary pilot valve and the secondary pressure line from the second secondary pilot valve, a pressure line communicating between the other opposed portion of the control member of the first secondary pilot valve and the primary pressure line from the second primary pilot valve, a pressure line communicating between one of said opposed portions of the control member of the second secondary pilot valve and the secondary pressure line from the first secondary pilot valve, and a pressure line communicating between the other opposed portion of the control member of the second secondary pilot valve and the primary pressure line from the first primary pilot valve.

7. In a control system for directing a flow of fluid alternately into and from first and second containers through an inlet and outlet flow line connected to each of said containers, the improvement comprising; and inlet flow valve element in each inlet flow line and an outlet flow valve element in each outlet flow line, each said flow valve element having a valve opening and a valve closing chamber so constructed and arranged that application of fluid pressure to the valve opening chamber opens the flow valve element and exhausts fluid pressure from the valve closing chamber and the application of fluid pressure to the valve closing chamber closes the flow valve element and exhausts fluid pressure from the valve opening chamber; a primary pressure system including first and second primary pilot valves associated with said first and second containers respectively, each of said primary pilot valves adapted simultaneously to direct fluid to a first primary pressure line and drain it from a second primary pressure line when liquid in each of the respective containers reaches a predetermined upper level and to simultaneously direct fluid pressure to the second primary pressure line and drain it from the first primary pressure line when the liquid reaches a predetermined low level, one of the first primary pressure lines communicating between said first primary pilot valve and the valve opening chamber of the outlet flow valve element in the flow line connected to the first container, one of the second primary pressure lines communicating between the first primary pilot valve and the valve closing chamber of said last mentioned flow valve element, another first primary pressure line communicating between the second primary pilot valve and the valve opening chamber of the outlet flow valve element in the outlet line connected to the second container, and a second primary pressure line communicating between the second primary pilot valve and the valve closing chamber of said last mentioned outlet valve element; and a secondary pressure system including, first and second pressure operated secondary pilot valves each adapted in a first position to simultaneously direct fluid pressure to a first secondary pressure line and drain it from a second secondary pressure line and in a second position to simultaneously direct fluid pressure to the second secondary pressure line and drain it from the first secondary pressure line, a control member in each secondary pilot valve constructed and arranged to move said secondary pilot valve between said first and second positions upon alternate application of fluid pressure to opposed portions of said control member, one of the first secondary pressure lines communicating between said first secondary pilot valve and the valve closing chamber of the inlet flow valve element in the inlet line to the first container, one of the second secondary pressure lines communicating between said first secondary pilot valve and the valve opening chamber of said last mentioned inlet flow valve element, another first secondary pressure line communicating between said second secondary pilot valve and the valve closing chamber of the inlet flow valve element in the inlet line to the second container, another second secondary pressure line communicating between said second secondary pilot valve and the valve opening chamber of said last mentioned inlet flow valve, a pressure line communicating between one of said opposed portions of the control member of the first secondary pilot valve and the second secondary pressure line from the second secondary pilot valve, a pressure line communicating between the other opposed portion of the control member of the first secondary pilot valve and the first primary pressure line from the second primary pilot valve, a pressure line communicating between one of said opposed portions of the control member of the second secondary pilot valve and the second secondary pressure line from the first secondary pilot valve, and a pressure line communicating between the other opposed portion of the control member of the second secondary pilot valve and the first primary pressure line from the first primary pilot valve.

8. The improvement of claim 7 in which each of the inlet valve elements and outlet valve elements includes spring means assisting the closing of said valve elements.

9. A separating and metering assembly for separating liquids and gases and metering the liquids, said assembly comprising a vessel adapted to hold liquid, a substantially horizontal partition secured to and extending across the interior of the vessel dividing the vessel into upper and lower separating and metering containers, a gas outlet in an upper part of each container, an outlet flow line connected to each container at a point on a lower portion of the container, an inlet flow line connected to each container at a point above the connection of the outlet flow line to the container, and flow control means alternately directing fluid to one container through the inlet flow line connected to said container while draining a measured volume of liquid from the other container through the outlet flow line connected to said other container.

References Cited in the file of this patent

UNITED STATES PATENTS

| | | |
|---|---|---|
| 2,241,286 | Werts | May 6, 1941 |
| 2,614,578 | Stickney | Oct. 21, 1952 |
| 2,876,641 | Brown | Mar. 10, 1959 |
| 2,936,622 | Glasgow | May 17, 1960 |
| 2,954,693 | Nelson | Oct. 4, 1960 |
| 2,964,944 | Kuntz | Dec. 20, 1960 |
| 2,977,796 | Pope et al. | Apr. 4, 1961 |
| 3,010,317 | Scott et al. | Nov. 28, 1961 |

UNITED STATES PATENT OFFICE
CERTIFICATE OF CORRECTION

Patent No. 3,145,565                          August 25, 1964

Horace V. Smith et al.

It is hereby certified that error appears in the above numbered patent requiring correction and that the said Letters Patent should read as corrected below.

Column 19, line 64, before "opening" insert -- while --.

Signed and sealed this 9th day of March 1965.

(SEAL)
Attest:

ERNEST W. SWIDER                          EDWARD J. BRENNER
Attesting Officer                             Commissioner of Patents